United States Patent [19]

Van Lengerich

[11] Patent Number: 5,077,074

[45] Date of Patent: * Dec. 31, 1991

[54] PREPARATION OF COOKIE PRODUCTS INVOLVING EXTRUSION HEATING AND WIRE CUTTING

[75] Inventor: Bernhard Van Lengerich, Ringwood, N.J.

[73] Assignee: Nabisco Brands, Inc., Parsippany, N.J.

[*] Notice: The portion of the term of this patent subsequent to Feb. 12, 2008 has been disclaimed.

[21] Appl. No.: 489,237

[22] Filed: Mar. 5, 1990

Related U.S. Application Data

[63] Continuation-in-part of Ser. No. 362,378, Jun. 7, 1989, and a continuation-in-part of Ser. No. 362,599, Jun. 7, 1989, and a continuation-in-part of Ser. No. 362,693, Jun. 7, 1989, and a continuation-in-part of Ser. No. 362,473, Jun. 7, 1989, and a continuation-in-part of Ser. No. 362,748, Jun. 7, 1989, and a continuation-in-part of Ser. No. 362,695, Jun. 7, 1989, and a continuation-in-part of Ser. No. 362,694, Jun. 7, 1989, and a continuation-in-part of Ser. No. 362,674, Jun. 7, 1989, and a continuation-in-part of Ser. No. 362,659, Jun. 7, 1989.

[51] Int. Cl.[5] .................. A21D 8/00; A21D 13/00
[52] U.S. Cl. .................. 426/549; 426/497; 426/502; 426/503; 426/504; 426/516; 426/518
[58] Field of Search .............. 426/549, 497, 502, 503, 426/504, 516, 518

[56] References Cited

U.S. PATENT DOCUMENTS

| | | |
|---|---|---|
| 1,625,022 | 4/1927 | Fousek . |
| 2,120,138 | 6/1938 | Mathews et al. ............ 99/81 |
| 2,183,693 | 12/1939 | Rasch ......................... 107/14 |
| 2,488,046 | 11/1949 | Werner et al. .............. 107/29 |
| 2,582,542 | 1/1952 | Hein ........................... 107/29 |
| 2,838,012 | 6/1958 | Weidenmiller et al. ..... 107/29 |
| 2,838,013 | 6/1958 | Weidenmiller et al. ..... 107/29 |
| 3,021,220 | 2/1962 | Going et al. ................ 99/92 |
| 3,064,589 | 11/1962 | Genich ....................... 107/29 |
| 3,158,486 | 11/1964 | Mork et al. ................. 99/86 |
| 3,195,868 | 7/1965 | Loomans et al. ........... 259/104 |
| 3,215,094 | 11/1965 | Oldershaw et al. ........ 107/54 |
| 3,275,449 | 9/1966 | Fritzberg .................... 99/80 |
| 3,393,074 | 7/1968 | Ehrlich ....................... 99/92 |
| 3,424,590 | 7/1969 | Booras ........................ 99/90 |
| 3,458,321 | 7/1969 | Reinhart ..................... 99/80 |
| 3,462,276 | 8/1969 | Benson ....................... 99/81 |
| 3,480,445 | 11/1969 | Slaybaugh .................. 99/83 |
| 3,482,992 | 10/1969 | Benson ....................... 99/81 |
| 3,490,750 | 1/1970 | Brennan ..................... 259/104 |
| 3,492,127 | 1/1970 | Ketch et al. ................ 99/86 |
| 3,615,675 | 10/1971 | Wisdom ...................... 99/83 |
| 3,682,652 | 8/1972 | Corbin et al. ............... 99/83 |
| 3,692,535 | 9/1972 | Norsby ....................... 99/92 |
| 3,732,109 | 5/1973 | Poat et al. .................. 99/83 |
| 3,753,729 | 8/1973 | Harms et al. ............... 99/82 |
| 3,767,421 | 10/1973 | Gulstad et al. ............. 426/153 |
| 3,767,422 | 10/1973 | Levitz ......................... 426/152 |
| 3,769,034 | 10/1973 | Dreier, Jr. et al. ......... 426/151 |
| 3,861,287 | 1/1975 | Manser ....................... 99/348 |
| 3,908,025 | 9/1975 | Miller et al. ................ 426/623 |
| 3,922,369 | 11/1975 | Glicksman et al. ......... 426/548 |
| 3,987,207 | 10/1976 | Spaeti et al. ................ 426/99 |

(List continued on next page.)

FOREIGN PATENT DOCUMENTS 1247926 1/1989 Canada .......................... 113/

(List continued on next page.)

OTHER PUBLICATIONS

Anderson et al., "Gelatinization of Corn Grits by Roll Cooking Extrusion Cooking and Steaming", *Die Strake* 22, Jahrg, Nr. 4, pp. 130–134.

(List continued on next page.)

*Primary Examiner*—Jeanette Hunter
*Assistant Examiner*—Mary S. Mims

[57] ABSTRACT

The present invention relates to the production of cookie products by adding cookie ingredients to a cooker extruder to form a heat treated mass, which is admixed with additional cookie ingredients to form a dough-like cookie mixture. The cookie mixture is subsequently wire cut into individual pieces. The individual dough pieces can then be further subjected to post extrusion heating to leaven them.

54 Claims, 13 Drawing Sheets

U.S. PATENT DOCUMENTS

| | | | |
|---|---|---|---|
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |
| 4,099,455 | 7/1978 | Wenger et al. | 99/450.1 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,251,551 | 2/1981 | VanHulle et al. | 426/94 |
| 4,277,464 | 7/1981 | Reussner et al. | 424/177 |
| 4,285,271 | 8/1981 | Falck et al. | 99/348 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,409,250 | 10/1983 | Van Hulle et al. | 426/242 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 7/1984 | McCulloch | 99/348 |
| 4,455,333 | 6/1984 | Hong et al. | 426/94 |
| 4,465,447 | 8/1984 | Cheigh et al. | 425/72 |
| 4,465,452 | 8/1984 | Masüzawa | 425/308 |
| 4,478,857 | 10/1984 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seeni et al. | 426/99 |
| 4,608,261 | 8/1986 | MacKenzie | 426/242 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,423 | 8/1988 | Strong | 426/283 |
| 4,764,388 | 8/1988 | Sullivan et al. | 426/311 |
| 4,770,890 | 9/1988 | Gidöey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,828,853 | 5/1989 | Banks et al. | 426/94 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |
| 4,892,471 | 1/1990 | Baker et al. | |
| 4,900,572 | 2/1990 | Repholz et al. | 426/282 |
| 4,904,493 | 2/1990 | Petrizelli | 426/549 |
| 4,911,939 | 3/1990 | Lou et al. | 426/241 |
| 4,948,611 | 8/1990 | Cummins | |
| 4,948,612 | 8/1990 | Keller et al. | |
| 4,990,348 | 2/1991 | Spratt et al. | 426/242 |

FOREIGN PATENT DOCUMENTS

| | | |
|---|---|---|
| 0052046 | 5/1982 | European Pat. Off. |
| 0098642 | 1/1984 | European Pat. Off. |
| 102232 | 3/1984 | European Pat. Off. |
| 0134322 | 3/1985 | European Pat. Off. |
| 0145550 | 6/1985 | European Pat. Off. |
| 0213007 | 3/1987 | European Pat. Off. |
| 0251375 | 1/1988 | European Pat. Off. |

(List continued on next page.)

OTHER PUBLICATIONS

Anderson et al., "The Terminology and Methodology Associated with Basic Starch Phenomena", *Cereal Foods World*, vol. 33, No. 3, p. 306 (Mar. 1988).

Atwell et al., "The Terminology and Methodology Associated with Basic Starch Phenomena", *Cereal Foods World*, vol. 33, No. 3, p. 306 (Mar. 1988).

Continuous Twin-Screen Processing—Future Oriented Technology, Werner & Pfleiderer Corporation, 663 East Crescent Ave., Ransey, N.J. (undated).

*Koch-Und Extruder-Techniken*, "Biscuits", Internationales Susswaren-Institut (1982).

Leung et al., "Storage Stability of a Puff Pastry Dough with Reduced Water Activity", *J. Food Science*, vol. 49, No. 6, p. 1405 (Nov.-Dec. 1984).

(List continued on next page.)

FOREIGN PATENT DOCUMENTS

| | | |
|---|---|---|
| 0252270 | 1/1988 | European Pat. Off. |
| 0266958 | 5/1988 | European Pat. Off. |
| 0275878 | 7/1988 | European Pat. Off. |
| 0296039 | 12/1988 | European Pat. Off. |
| 3238791 | 4/1984 | Fed. Rep. of Germany |
| 2602398 | 2/1988 | France |
| 0173040 | of 1984 | Japan |
| 0241841 | 11/1985 | Japan |
| 291249 | 8/1985 | Netherlands |
| 8606938 | 12/1986 | PCT Int'l Appl. |
| 0558141 | 12/1943 | United Kingdom |
| 1175595 | 12/1969 | United Kingdom |
| 1254562 | 11/1971 | United Kingdom |
| 1471108 | 4/1977 | United Kingdom |
| 1561190 | 2/1980 | United Kingdom |
| 2131670 | 6/1984 | United Kingdom |
| 2132868 | 7/1984 | United Kingdom |
| 2136666 | 9/1984 | United Kingdom |

OTHER PUBLICATIONS

Lorenz et al., "Baking with Microwave Energy", *Food Technology*, pp. 28-36 (Dec. 1973).

Mercier et al., *Extrusion Cooking*, pp. 347-353 and 404-415 (1989).

Nestl, Birgit, Doctoral Thesis, entitled "Formula and Process Optimization for the Extrusion of Baked Goods under Particular Consideration of Various Lipids and Sweeteners (Dietetic Products and Products with Different Nutritional Value)", Justus-Liebig University of Giessen, Giessen, W. Germany (filed Mar. 1989).

Processing: Extruded Snacks, Werner and Pfleiderer, GmbH, Postpach 30 1220 Theodorstrasse 10 7000 Stuttgart 30, West Germany (undated).

Rossen et al., "Food Extrusion", *Food Technology*, pp. 46-53 (Aug. 1973).

Sanderude, K., "Continuous Cooking Extrusion: Benefits to the Snack Food Industry", *Cereal Science Today*, vol. 14, No. 6, pp. 209-210 and 214 (Jun. 1969).

Unique Cooker Extruder, Food Engineering Intl., pp. 41-43 (May 1983).

Woollen, A., "Higher Productivity in Crispbread", *Cereal Foods World*, vol. 30, No. 5, pp. 333-334 (May 1985).

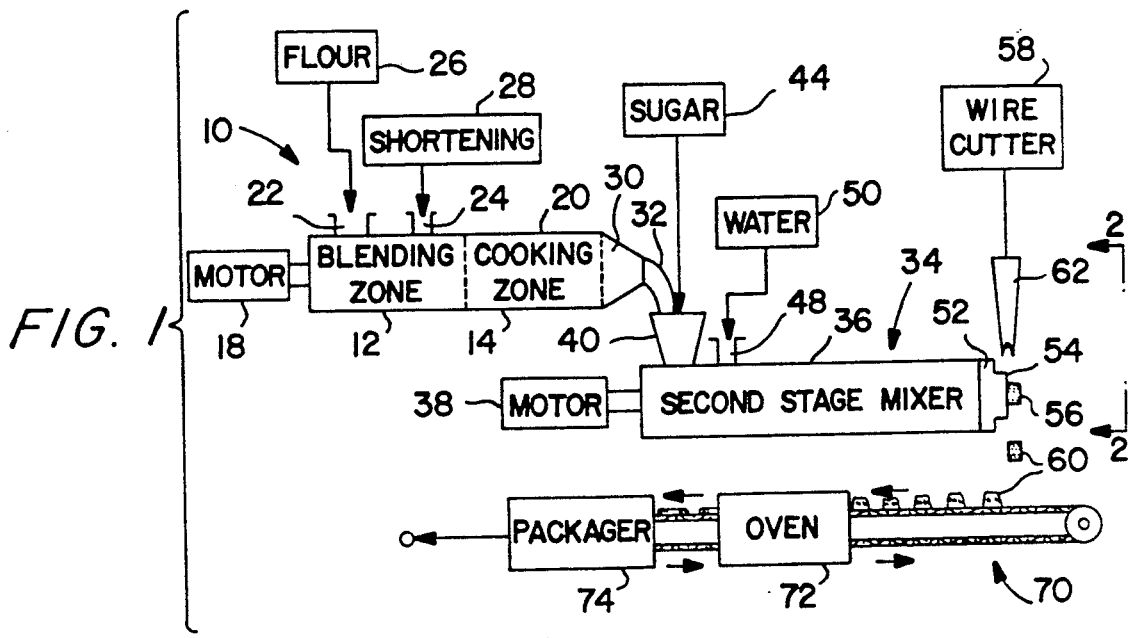
FIG. 1
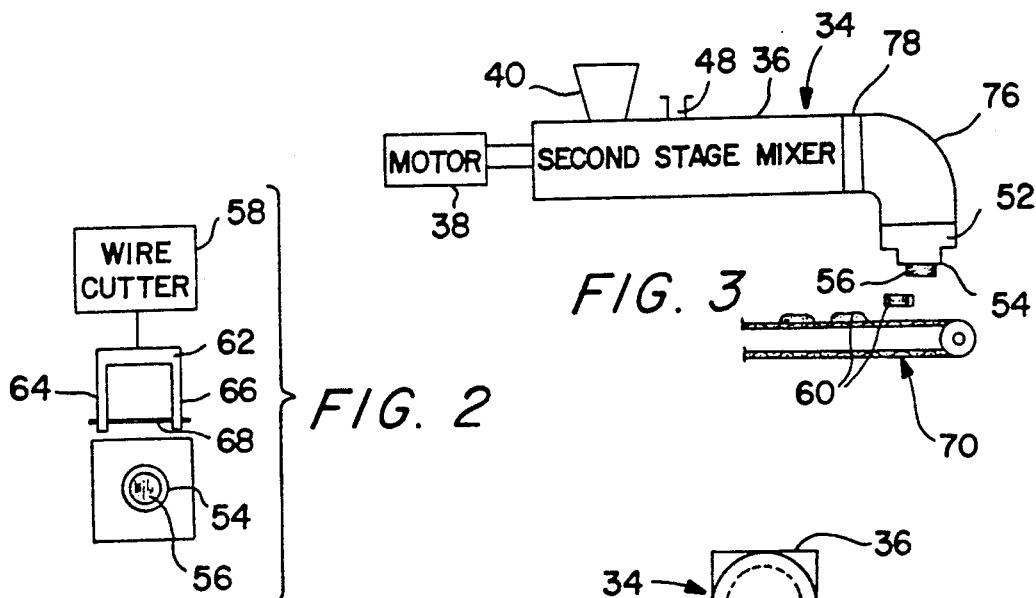
FIG. 2
FIG. 3
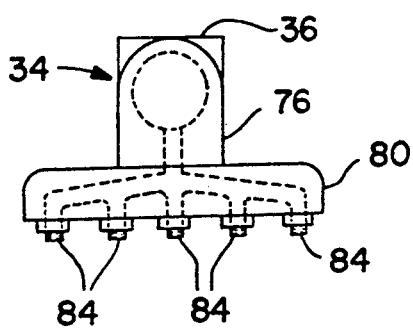
FIG. 4

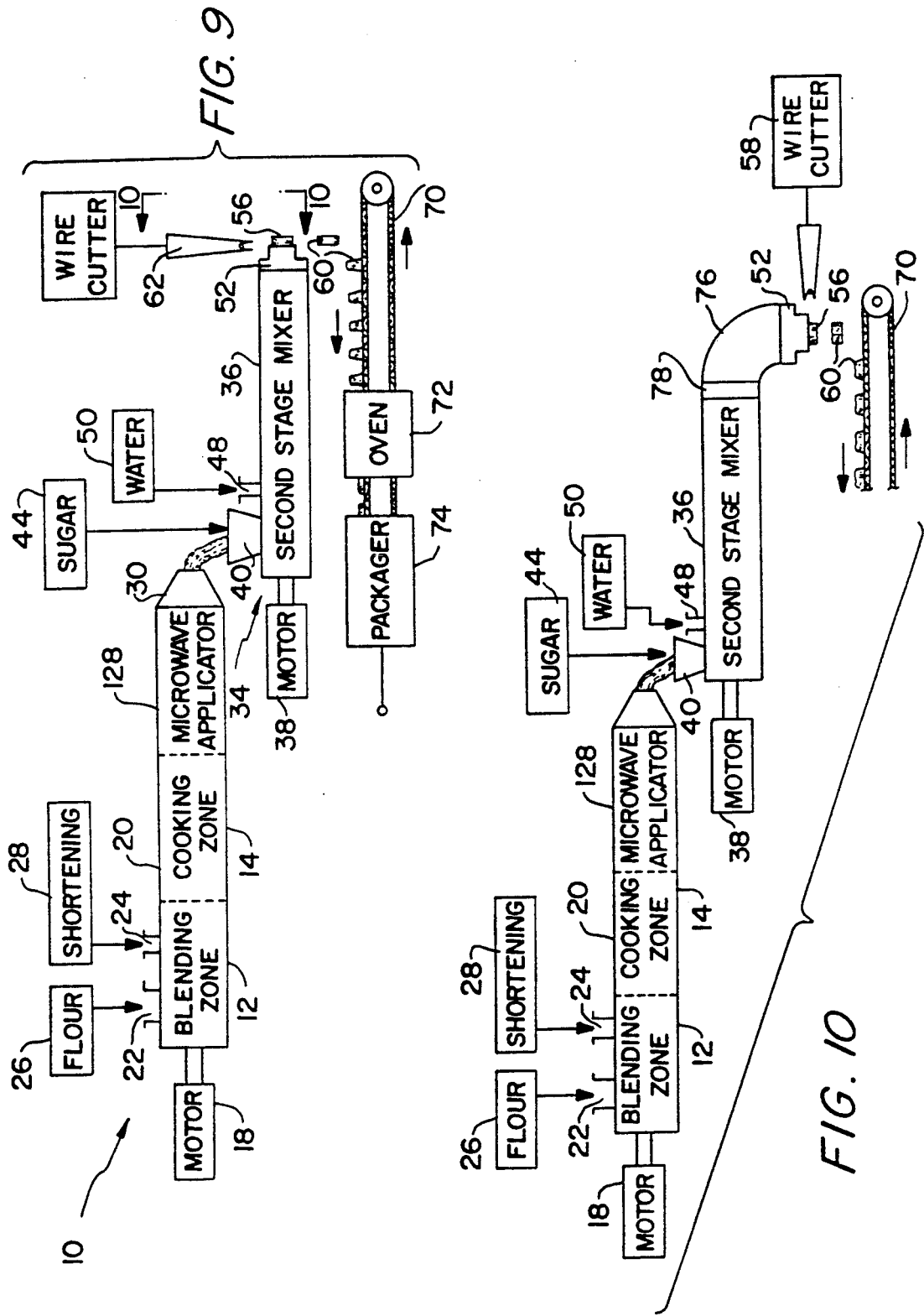

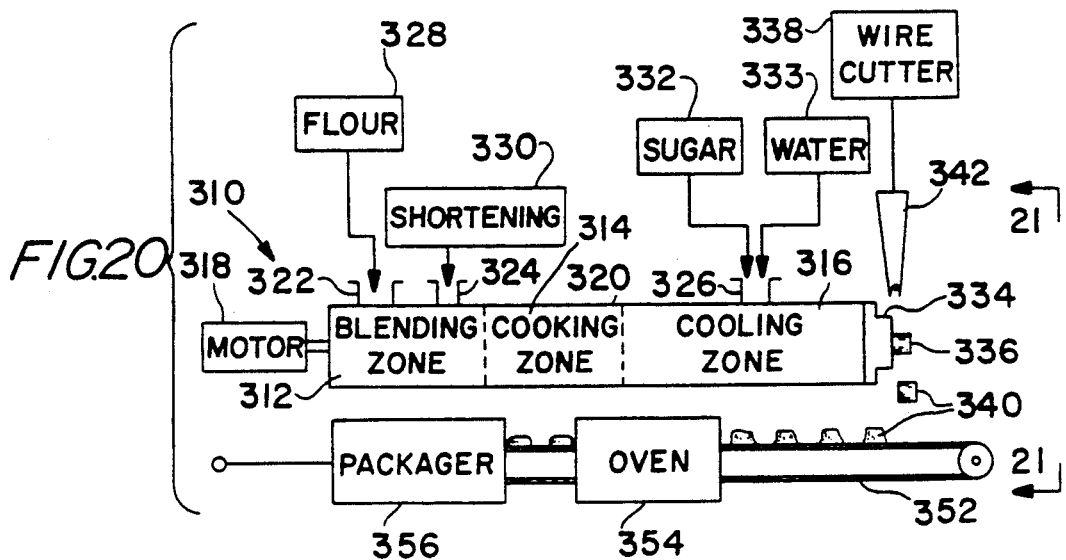
FIG. 20
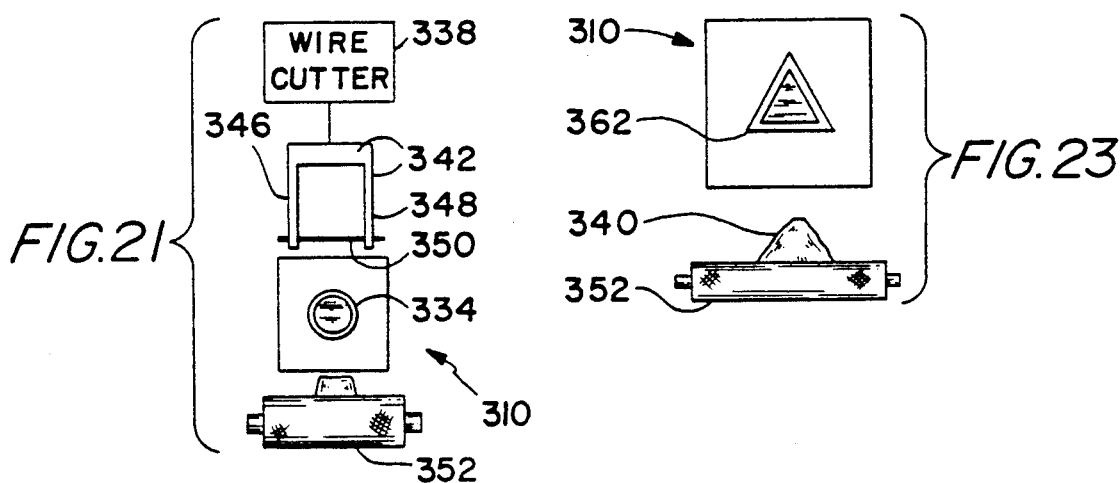
FIG. 21
FIG. 23
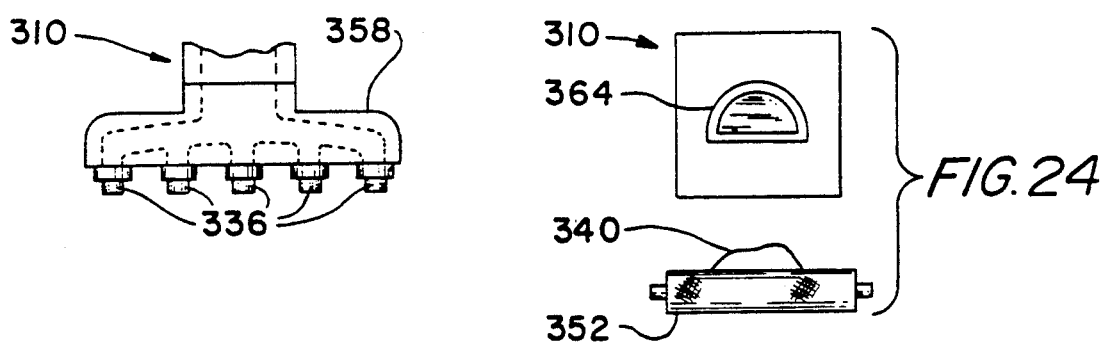
FIG. 22
FIG. 24

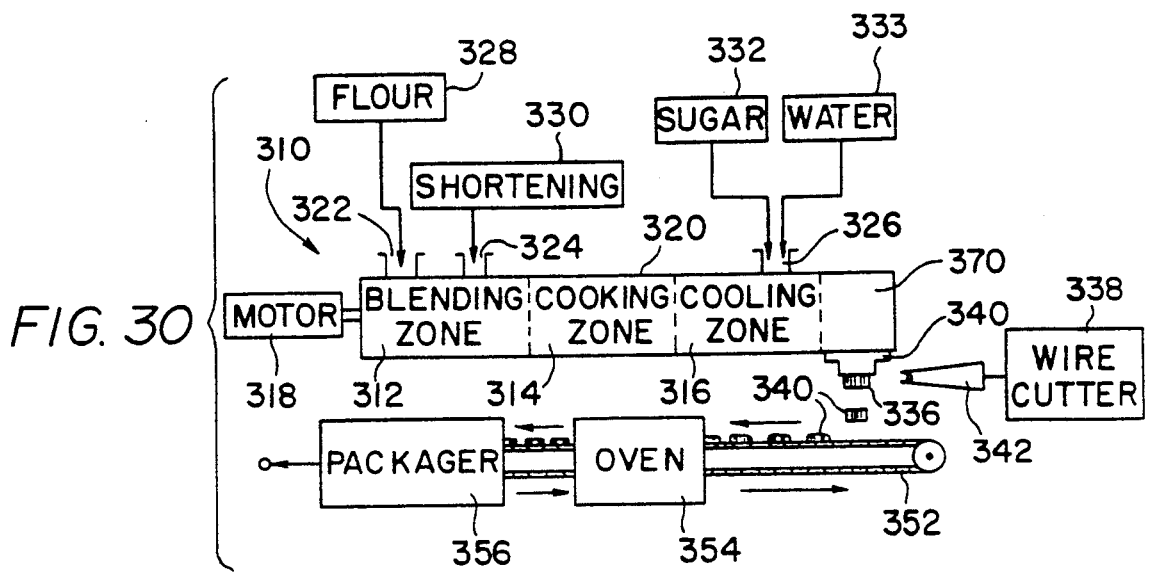
FIG. 30
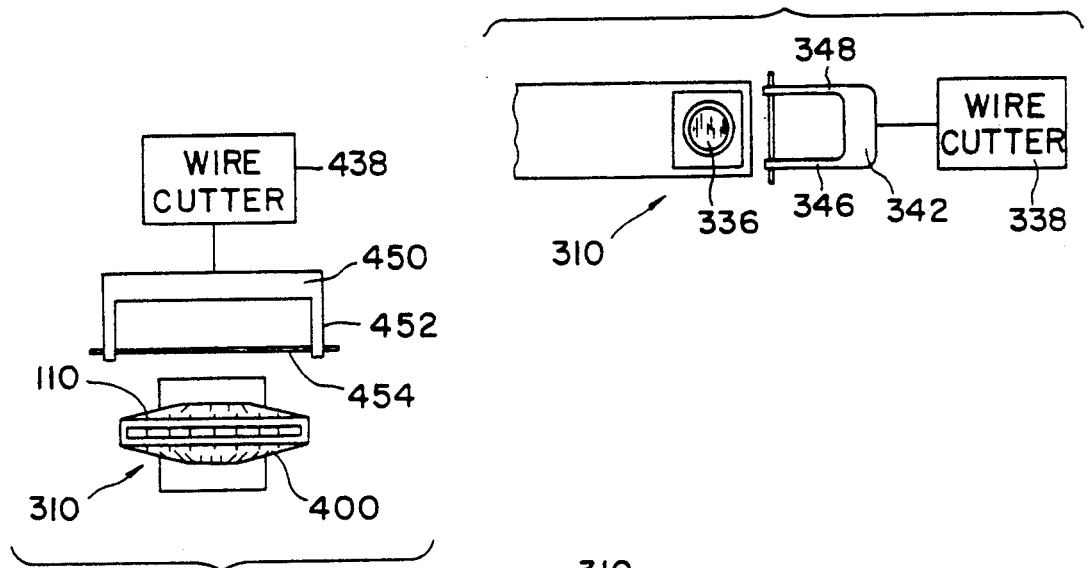
FIG. 31
FIG. 33
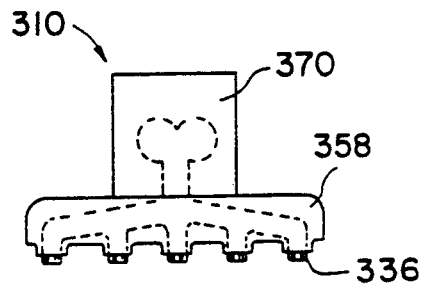
FIG. 32

PREPARATION OF COOKIE PRODUCTS INVOLVING EXTRUSION HEATING AND WIRE CUTTING

RELATED APPLICATIONS

This application is a continuation-in-part of U.S. application Ser. No. 362,378, U.S. application Ser. No. 362,599, U.S. application Ser. No. 362,693, U.S. application Ser. No. 362,473, U.S. application Ser. No. 362,748, U.S. application Ser. No. 362,695, U.S. application Ser. No. 362,694, U.S. application Ser. No. 362,674, and U.S. application Ser. No. 362,659 each filed on June 7, 1989.

FIELD OF THE INVENTION

The present invention relates to the production of cookie products using extrusion heat treatment, wire cutting, and post-extrusion baking.

BACKGROUND OF THE INVENTION

In the conventional batch production of making cookies, ingredients are combined in a batch mixer and mixed for a period of time at ambient temperature and pressure until a raw cookie dough is produced. The raw dough is then transferred to another station to be processed typically by a conventional wire cut apparatus, which extrudes and then cuts the dough into individual dough pieces. Generally, the dough pieces as they are formed, are then transferred through an oven for baking.

In the production of a high oil content farinaceous composition by extrusion cooking, mobility and immiscibility of the water and oil phases generally increase with increasing temperature. Additionally, the mechanical action of extruder screws tends to increase separation of oil from the remaining mass. The tendency for the oil to separate is at locations within the extruder at which the components are subjected to the highest pressure. Exemplary of high pressure locations in a twin screw extruder are: 1) the space between the extruder screw tips and the die orifice, and 2) the narrowest or more restricted passageways between the left and right hand screw elements.

Oil separation under system pressure (screw or die pressure) can be manifested in extruder surging or uneven mass flow rates from the die. Upon extrusion from the die, separated oil may: 1) appear as a coating on the remaining dough mass, or 2) periodically discharge separately from the remaining dough mass. Non-homogeneous dough production and discontinuous extruder operation may thus result from oil separation. The problem of oil separation increases with increasing oil levels.

Water separation from flour, up to the boiling point of water, is generally not a problem because of the more hydrophilic properties of flour components such as gluten and starch. As flour and water temperatures are raised, increased migration of water into starch granules, protein (e.g. gluten) denaturization, and starch gelatinization tend to occur. The binding or reaction of water with flour components may promote separation of oil: a) by making the flour components more polar or hydrophilic and b) by creating a greater mass of hydrophilic components.

Conventional cookie production involves forming cookie dough preforms or pieces followed by baking of the pieces. Low temperatures, typically at about room temperature, are used to form the dough. The low temperature mixing generally avoids separation of shortening or fat from hydrophilic dough components. While baking temperatures in a conventional oven, such as a band oven, may promote oil separation, there is no mixing or pressing action performed at the baking temperatures. Any oil separation which may occur in such ovens does not generally interfere with continuous operability of the cookie production process as it would in a continuous cooker/extruder process.

In addition to high temperature mixing and high system pressure, the presence of sugar in a cookie dough may also increase oil and water separation. Solubilization of sugars in water increases the relative amount of the hydrophilic mass. This in turn may tend to promote oil separation.

Oil separation may also occur in post extrusion forming operations where pressure is exerted on the cookie dough. Excessive lowering of dough temperature may adversely affect dough consistency, machinability, and formability. Also, in forming the dough into pieces, it is generally desireable that the forming operation result in an orderly or substantially uniform placement of the pieces on a conveyer belt for subsequent baking and/or packaging.

In the process of the present invention, cookie products are produced using an extrusion cooker to promote Maillard browning and flavor development without the problems caused by the separation of oil from the remaining cookie dough mass. The extrusion heated doughs are formed into pieces using wire-cutting to substantially uniformly deposit the pieces for subsequent leavening and/or packaging. The extruded cookies or cookie-like products of the present invention have a cookie crumb or crumb-like structure and texture and exhibit structural integrity.

SUMMARY OF THE INVENTION

The present invention provides a continuous process for the production of cookie products using a cooker extruder to form a dough-like cookie mixture and a wire cutter to form individual pieces from the dough-like mixture. Preferably, the extrudates are formed into pieces at temperatures of from about 100° F. to about 150° F. Consistency, viscosity, and plasticity of the dough-like mixture for proper wire cutting may be adjusted, for example, by water or oil addition or reduction, by heating, or by combinations thereof. The wire cutting operation substantially uniformly deposits the pieces on a conveyer belt, for example, for subsequent leavening and/or packaging.

The individual pieces can be subjected to post extrusion heating, such as dielectric radio frequency baking, microwave baking, conductive baking, hot air baking, infrared heating, frying or combinations thereof to make cookie products, which exhibit a cookie crumb-like structure and structural integrity.

In embodiments of the present invention a post extrusion mixer is used to obtain the dough-like cookie mixture. When a post-extrusion mixer is utilized, substantially the entire maximum available length of the extruder can be used to heat treat ingredients comprising shortening or fat, flour and optionally, at least one texturizing ingredient such as sugar. The heat treatment permits significant production of browning and flavor components. It further substantially reduces the amount of post extrusion heat treatment required for final baking of the output product. Also, thermal stress on the extruder screws may be reduced by maintaining a more even temperature profile in the extruder.

A cookie crumb-like structure is achieved by avoiding substantial starch gelatinization. Ingredients comprising flour and shortening or fat are admixed and heated in a cooker extruder. Preferably, the starch carrying ingredients are coated with the oil, and then water is added to the hot flour and oil mass during and/or after heat treatment. Using an amount of water such that the water content of the dough-like mixture is sufficiently low so as to avoid substantial starch gelatinization further assures that no or substantially no starch gelatinization occurs. The use of low water contents also tends to reduce oil separation from hydrophilic cookie dough components at elevated temperatures.

In embodiments of the present invention the ingredients are heated in the cooker extruder to a high temperature, for example at least about 150° F., to reduce post extrusion baking time, and promote Maillard browning and flavor development. Preferably, the ingredients are heated to a temperature of at least about 200° F., more preferably at least about 250° F., most preferably from about 300° F. to about 500° F., to obtain a heat-treated mass. The heat treated mass is formed at a relatively low pressure within the cooker extruder, generally less than about 20 bars absolute, preferably less than about 10 bars absolute.

In embodiments of the present invention, the heat treated mass is cooled and admixed at low pressures with liquid water or a source of water and optional sugar to obtain a substantially homogeneous dough-like mixture.

The admixing with the heat treated mass may be in the extruder or in a post extrusion or second stage mixing device. Post extrusion mixing devices which may be used include a continuous mixer or a second stage extruder or combinations thereof.

The heat treated mass is cooled to a sufficiently low temperature so that upon its encountering of points of high pressure, the added water does not cause substantial oil separation and extruder surging. Cooling of the heat treated mass is preferably initiated prior to and continues after addition of the water. The temperature of the dough-like mixture which is formed in the extruder or in the post extrusion mixing device is most preferably less than about 150° F. but above about 100° F. at the exit end of the cooker extruder or post extrusion mixer, respectively.

Preferably, the heat treated mass temperature upon addition of or during admixing with water or a liquid source of water in the cooker extruder and/or in the post extrusion mixer is from about 100° F. to about 300° F., more preferably from about 110° F. to about 212° F. If the heat treated mass temperature is too low, viscosity may deleteriously increase, mixing may be more difficult, pressure may increase and substantial oil separation or surging may occur. Also, higher temperatures in the cooker extruder and/or in the post extrusion mixing device reduce post extrusion heating times.

The added shortening or fat content of the dough-like mixture may, for example, be from about 12% by weight to about 40% by weight, preferably from about 20% by weight to about 30% by weight, based upon the weight of the dough-like mixture.

The elimination or significant reduction of added water or a source of added water in a cooker extruder or post extrusion mixer tends to reduce oil separation from hydrophilic cookie dough components at elevated temperatures. It also reduces post extrusion heating time. However, added water or a source of water is needed in cookie production for formability or machinability of cookie doughs into sheets or pieces at high production rates. Water also helps to disperse cookie ingredients and to promote flavor and color development.

In the present invention, preferably the amount of water added is less than the amount needed to reach a threshold or maximum consistency. In preferred embodiments of the present invention, the amount of water added to the heat treated mass may range from about 0.5% by weight to about 10% by weight, based upon the weight of the dough-like mixture. It may, for example, be from about 2% by weight to about 6% by weight, based upon the weight of the dough-like mixture, depending upon the heat treatment temperatures and the desired consistency for shaping or forming.

The water content of the dough-like mixture is preferably as low as possible to reduce post extrusion heating time and to reduce the risk of substantial oil separation and extruder surging. It is generally less than about 20% by weight, preferably less than about 15% by weight, more preferably less than about 10% by weight, based upon the weight of the dough-like mixture.

Process compatible ingredients can be added to adjust the texture of the products produced by the process of the present invention. For example, the relative amount of at least one solid, crystalline, or granulated sugar, such as sucrose, which is subjected to the heat treatment can be used to control the tenderness and crunchiness of the final product. Addition of a solid, or crystalline or granulated sugar, such as sucrose, and subjecting it to high extrusion temperatures tends to melt and/or dissolve the sugar crystals and thus promote a crunchy texture in the final product. Addition of all or a portion of the solid sugar to the cooled mass rather than subjecting it to high extrusion temperatures tends to avoid sugar melting and/or dissolution, and promotes a tender texture in the final product. In embodiments of this invention the sugar component may be added in an amount to provide, for example, from about 10% by weight to about 40% by weight, preferably from about 20% by weight to about 30% by weight total sugar solids, based upon the total weight of the dough-like mixture. Crystalline or granulated sucrose alone or used with other sugars is preferred.

Dough-like mixtures of the present invention are extrudable through a die into a continuous rope or sheet. The pressure drop upon extrusion or across the extruder die is generally less than about 20 bars absolute, preferably less than about 10 bars absolute. The work done in producing the heat treated mass or the dough-like mixture, defined as the specific mechanical energy is generally low, for example less than about 40 watt-hrs/kg (or 18 watt-hrs/lb). Preferably, substantial frictional heating does not occur in the cooker extruder with substantially all of the heating being provided by external or jacketed heaters.

Puffing or expansion due to moisture or steam release upon exiting of the dough-like mass from the cooker extruder or from the post extrusion mixer typically does not occur. The cooker extrudate or the post extrusion mixer extrudate is cut into pieces and the pieces are leavened and further browned by subjecting them to at least one other heating source, such as a microwave oven, infrared oven, convection oven, dielectric radio frequency oven, a fryer, or conductive heater, to obtain cookie products which exhibit structural integrity and a crumb-like structure and texture. Generally, the volume increase upon post extrusion heating ranges from about 20% to about 200%.

Leavening agents are optional and may be included in amounts up to about 5% by weight, based upon the weight of the dough-like mixture. Dough-like mixtures of the present invention having a shelf-stable water activity of less than about 0.7, preferably less than about 0.6 may be packaged as shelf stable products in moisture and oxygen impermeable packaging materials for subsequent leavening and browning in conventional home microwave or convection ovens.

BRIEF DESCRIPTION OF THE DRAWINGS

Apparatus for carrying out the process according to the present invention are illustrated in the accompanying drawings wherein:

FIG. 1 is a schematic side view of a cooker extruder in combination with a second stage mixer and wire cutter, useful in the present invention;

FIG. 2 is an end view of the downstream end of the second stage mixer, illustrated in FIG. 1;

FIG. 3 is a schematic side view of a second stage mixer provided with a flow diverter;

FIG. 4 is a schematic downstream end view of a second stage mixer provided with a manifold;

FIG. 9 is a schematic side view of a cooker extruder in combination with a microwave applicator, second stage mixer and wire cutter, useful in the present invention;

FIG. 10 is a schematic side view of the combination illustrated in FIG. 9, with the second stage mixer provided with a flow diverter;

FIG. 20 is a schematic side view of a cooker extruder apparatus having a wire cutter for cutting the extrudate at the extruder die;

FIG. 21 is an end view of the downstream end of the cooker extruder apparatus illustrated in FIG. 20;

FIG. 22 is a partial schematic top view of the downstream end of the cooker extruder illustrated in FIG. 20, modified with a manifold having a plurality of die orifices;

FIG. 23 is a schematic end view of the downstream end of the cooker extruder illustrated in FIG. 20, modified with a triangular-shaped extruder die;

FIG. 24 is a schematic end view of the downstream end of the cooker extruder illustrated in FIG. 20, modified with a semi-circular shaped extruder die;

FIG. 30 is a schematic side view of a cooker extruder apparatus provided with an internal flow diverter and a wire cutter for cutting the extrudate at the die attached to the exit of the diverter;

FIG. 31 is a partial bottom end view of the downstream end of the cooker extruder apparatus illustrated in FIG. 30; and FIG. 32 is an end view of the downstream end of the cooker extruder illustrated in FIG. 30, modified with a manifold.

FIG. 33 is a downstream end view of the cooker extruder apparatus of FIG. 20 and a sheet forming die having a wire cutter.

DETAILED DESCRIPTION OF THE INVENTION

Figure 5:
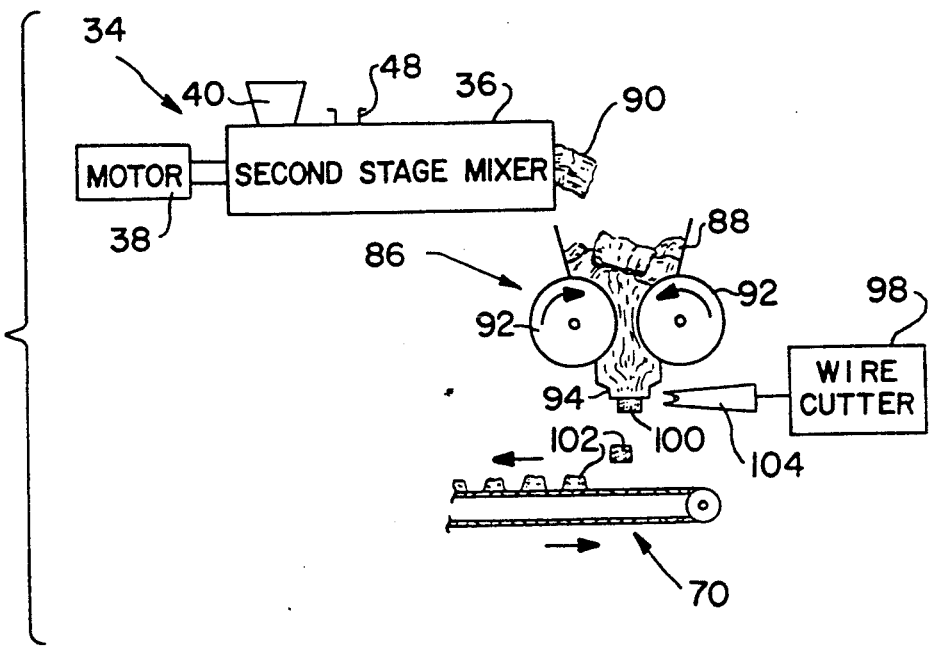
FIG. 5 is a schematic side view of a second stage mixer in combination with a wire cut apparatus.

In the present invention cookies are continuously produced using an extrusion cooker to continuously mix ingredients, reduce post extrusion heating time, and promote browning and flavor development. In preferred embodiments of the present invention, the heat treated mass continuously produced in the extrusion cooker is extruded and transferred to a post extrusion or second stage mixer, where it is cooled and admixed with ingredients comprising water to form a dough-like mixture. In embodiments of the present invention the dough-like mixture is produced in a cooker extruder without a post extrusion mixer.

The dough-like mixture continuously produced in the extrusion cooker or the post extrusion mixer is leavened using at least one other energy source to obtain baked goods having a crumb-like structure or cookie crumb.

The post extrusion leavening may be by microwave energy, dielectric radio frequency energy, infrared energy, conductive heating, frying, or heated air, such as from a convection oven or fluidized bed heater. In addition to leavening the composition, the post extrusion heating further browns the dough-like mixture.

Separation of oil from the remaining mass and extruder surging are avoided preferably by admixing water into heat-treated ingredients comprising flour and oil which are at a temperature of about 100° F. to about 300° F., more preferably from about 110° F. to about 212° F. In embodiments of the present invention, water addition may be after and/or during substantial cooling of the heat treated ingredients. After the cooling of the heat treated ingredients, the post extrusion heating leavens the substantially unleavened extrudate. The volume increase resulting from the post extrusion heating or leavening step generally ranges from about 20% to about 200%, based upon the volume of the extrudate.

As shown in FIG. 1, a cooker extruder 10 is diagrammatically illustrated so as to have a plurality of processing zones. For example, the cooker extruder 10 includes a "blending" zone 12 and a "cooking" zone 14 disposed along the length of the cooker extruder 10. The cooker extruder 10 is provided with a drive or motor 18 for rotating at least one extruder screw (not shown) rotatably disposed within barrel 20 generally constructed of a plurality of barrel sections. In addition, the cooker extruder 10 is fitted with one or more feed ports for adding ingredients such as one or more types of flour, shortening, sugar, artificial sweetener, flavoring agents, vitamins, and other ingredients of a cookie mixture to the cooker extruder 10, as indicated in FIG. 1.

More specifically, the cooker extruder 10 can be provided with a plurality of feed ports such as feed ports 22, 24 for adding various ingredients at different positions and zones along the length of the cooker extruder 10. For example, one or more types of flour 26, sugar and other dry ingredients of the cookie mixture can be added through feed port 22 to the cooker extruder 10. Shortening 28, such as vegetable oil, can be added slightly downstream relative to the addition of the flour 26, through feed port 24.

In this embodiment, flour 26 and shortening 28 are added upstream relative to the "cooking" zone 14. Sugar and heat labile ingredients such as some artificial sweeteners, flavoring agents and vitamins can be added downstream relative to the cooker extruder 10 to reduce the amount of heat treatment of these ingredients.

The cooker extruder 10 can be provided with temperature control means such as by providing electrical resistance heaters (not shown) and/or fluid jackets (not shown) as integral parts of or separate components of the barrel sections of the barrel 20. Preferably, each barrel section is provided with temperature control means so as to allow the temperature along the length of the cooker extruder 10, and accordingly the temperature of the ingredients to be precisely controlled. Temperature control by heat exchange between the barrel 20 and the fluid jackets can be accomplished by circulating fluid such as water at a predetermined temperature from a source, such as a steam generator, water cooling system, etc.

The downstream end of the cooker extruder 10 can be provided with an extruder die 30 for shaping and/or further extruding the heat treated mass 32. The extruder die 30 can have a single die orifice, or can have plural die orifices.

A post extrusion or second stage mixer 34 can be positioned downstream relative to the cooker extruder 10. The second stage mixer 34 can comprise a barrel 36 containing one or more rotatably disposed mixing screws (not shown) driven by motor 38. For the addition of ingredients to the second stage mixer 34, one or more feed ports can be provided along the length of the second stage mixer 34. For example, the second stage mixer 34 can be provided with a feed port in the form of a hopper 40 for the addition of the heat treated mass 32 and sugar 44, and a separate feed port 48 for the addition of water 50. The second stage mixer 34 can be positioned below and at the downstream end of the cooker extruder 10 so as to receive heat treated mass 32 gravity fed from the cooker extruder 10. However, the cooker extruder 10 and second stage mixer 34 can be separated by a distance with the heat treated mass 32 being transferred to the second stage mixer 34, for example, by a belt or bucket conveyor, slide, conduit or other conveying means.

The downstream end of the second stage mixer 34 can be provided with a mixer die 52 having one or more die orifices for shaping and/or further extruding the cookie mixture, for example, as a rope 56 upon exiting the second stage mixer 34.

A dough cutter, preferably a wire cutter 58, is positioned downstream relative to the second stage mixer 34. For example, the wire cutter 58 can be positioned at the exit end 54 of the mixer die 52 for cutting the forming rope 56 into individual pieces 60. Alternatively, the wire cutter can be located at a remote location with means for conveying the cookie mixture or rope 56 from the second stage mixer 34 to the remotely located wire cutter.

The wire cutter 58 can comprise a frame 62, as shown in FIG. 2, including support arms 64, 66 supporting a cutoff wire 68. The frame 62 can be slidably supported by a guide (not shown) and driven by an actuator (not shown). For example, the actuator can be a hydraulic or pneumatic piston/cylinder connected to an appropriate power source of air or hydraulic fluid in combination with a control for regulating the movement of the actuator.

The cooker extruder 10 and second stage mixer 34 can be arranged substantially horizontally, as illustrated in FIG. 1, so that the ingredients of the cookie mixture can be fed, for example, by gravity feeding the ingredients from above the cooker extruder 10 and second stage mixer 34. The heat treated mass 32 can be conveyed in a substantially vertical direction from the end of the cooker extruder 10. The second stage mixer 34 can be positioned below and at the downstream end of the cooker extruder 10 for receiving the gravity fed heat treated mass 32 from the cooker extruder 10. The cookie mixture formed in the second stage mixer can be conveyed in a substantially horizontal direction from the end thereof. The wire cutter 58 can be arranged so that the individual pieces 60 are sliced from the rope 58 during a downward cutting stroke followed by an upward recovery stroke.

A conveyor 70 can be positioned below and at the downstream end of the second stage mixer 34. The conveyor 70 receives the individual pieces 60 after wire cutting and conveys them to a post extrusion baking device, such as an oven 72, and then to a packager 74. Alternatively, the oven 72 can be eliminated with the dough-like cookie mixture being packaged without post extrusion heat treatment.

The wire cutter cuts the extrudate into pieces using a reciprocating motion which substantially uniformly deposits the individual pieces 60 on the conveyer 70. The substantially uniform distribution of pieces on the conveyor belt facilitates even post extrusion leavening in oven 72 and facilitates packaging in stacks or trays in packager 74 as well as transferring of the cut pieces between conveyor belts, for example.

Another arrangement of the second stage mixer 34 is illustrated in FIG. 3. In this arrangement, a flow diverter 76 such as an elbow or other bent conveying conduit can be fitted to the downstream end of the second stage mixer 34 for diverting the flow of the cookie mixture. For example, the flow diverter 76 can divert the flow downwardly to facilitate cutting of the rope 56 into individual pieces having a flat side that will fall into contact with a conveyor (not shown). Thus, the individual pieces will not substantially deform or suffer edge damage by landing on an edge after being cut from the rope 56. Further, a flow transition piece 78 can be provided between the second stage mixer 34 and flow diverter 76 to accommodate different sizes and/or shapes of the material flow paths through these components.

A further arrangement of the second stage mixer 34 is illustrated in FIG. 4. In this arrangement, the downstream end of the flow diverter 76 can be fitted with a manifold 80 for diverting and/or separating, for example, a single flow path through the flow diverter 76 into a plurality of flow passages. The manifold 80 can be provided with a plurality of die orifices for extruding the cookie mixture into a plurality of ropes 84.

As an alternative to the arrangement illustrated in FIG. 1, a separate wire cut apparatus 86 can be provided downstream relative to the second stage mixer 34, as illustrated in FIG. 5. The wire cut apparatus 86 can comprise a hopper 88 for receiving the cookie mixture or dough-like mixture 90 from the end of the second stage mixer 34. A pair of counter-rotating feed rollers 92 can be provided in a lower portion of the hopper 88. The direction of rotation of the counter-rotating feed rollers 92 is indicated die orifices can be located beneath the counter-rotating feed rollers 92, and a wire cutter 98 can be positioned below the wire cutter die 94. The cookie mixture 90 is formed into ropes 100 by the wire cutter die 94, which are then cut into individual pieces 102 by the wire cutter 98. The individual pieces 102 can be substantially uniformly received by conveyor 70 and transferred to an oven and/or packager (not shown).

Figure 6:
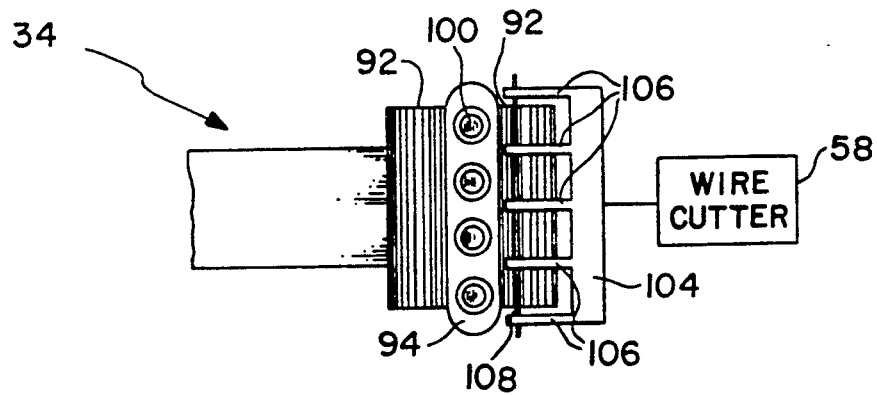
FIG. 6 is a partial bottom view of the second stage mixer in combination with the wire cut apparatus, illustrated in FIG. 5.

The wire cutter 98 can comprise a frame 104, as shown in FIG. 6, including a plurality of support arms 106 supporting a cutoff wire 108. The frame 104 can be slidably supported by a guide (not shown) and driven by an actuator (not shown). For example, the actuator can be a hydraulic piston/cylinder in combination with a control for regulating the movement of the piston/cylinder.

The wire cut apparatus 86 can be positioned immediately below the downstream end of the second stage mixer 34 for receiving cookie mixture exiting the end thereof and gravity fed to the hopper 88. Alternatively, the wire cut apparatus 86 can be positioned at a remote location with conveying means such as a belt or bucket conveyor provided between the second stage mixer 34 and the wire cut apparatus 86 conveying the cookie mixture so as to allow these components to be positioned at separate locations away from each other.

Figure 7:
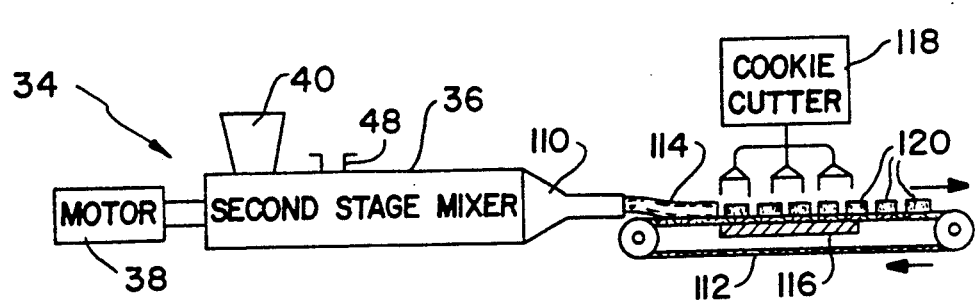
FIG. 7 is a schematic side view of a second stage mixer provided with a sheet forming die.

As a further alternative arrangement, the downstream end of the second stage mixer 34 can be fitted with a sheet forming die 110, as illustrated in FIG. 7. A sheet cutting device can be positioned downstream relative to the sheet forming die 110 for cutting the dough sheet into individual pieces. Vertically oriented wires (not shown) may be used to cut or slit the dough sheet 114 longitudinally into ribbons which are cut into individual pieces 120 by the cookie cutter 118. Vertically oriented wires 400 which may be used for forming the dough ribbons are illustrated in FIG. 33. A belt conveyor 112 can be positioned at the end of the sheet forming die 110 for receiving the dough ribbons from the second stage mixer 34, and a cutting support 116 and cookie cutter 118 can be provided for cutting the ribbons into individual pieces 120.

Figure 8:
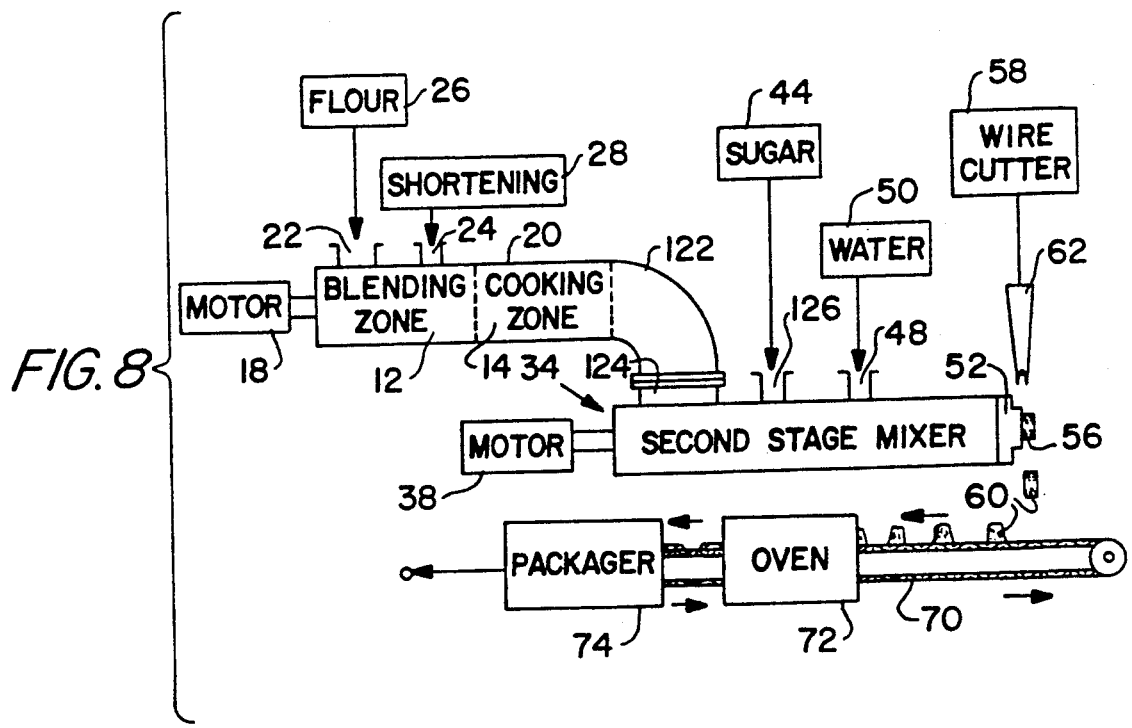
FIG. 8 is a schematic side view of a cooker extruder directly connected to a second stage mixer provided with a wire cutter.

The cooker extruder 10 can be directly connected to the second stage mixer 34 by a conveying conduit 122, as illustrated in FIG. 8. The conveying conduit 122 directs the flow of the heat treated mass from the cooker extruder 10 directly into a feed port 124 of the second stage mixer 34. An additional feed port 126 can be provided for the addition of sugar 44.

In another embodiment of the present invention, the cooker extruder 10 includes a "blending" zone 12 and a "cooking" zone 14 with a microwave applicator 128 connected to the downstream end of the cooker extruder 10, as illustrated in FIGS. 9 and 10. A microwave applicator which may be used is shown and described in copending U.S. patent application Ser. No. 441,230 entitled "Extruder And Continuous Mixer Arrangement For Producing An At Least Partially Baked Product Having A Cookie-Like Crumb Structure The Extruder Including A Microwave Applicator", filed in the name of Bernhard Van Lengerich on Nov. 22, 1989, which is a continuation of U.S. application Ser. No. 07/362,374, filed on June 7, 1989 and now abandoned. The disclosures of the two applications are incorporated herein by reference in their entireties.

In this embodiment, flour 26 and shortening 28 are added upstream relative to the "cooking" zone 14. Sugar and heat labile ingredients such as some artificial sweeteners, flavoring agents and vitamins can be added downstream relative to the cooker extruder 10 and/or microwave applicator to reduce the amount of heat treatment of these ingredients.

Figure 11:
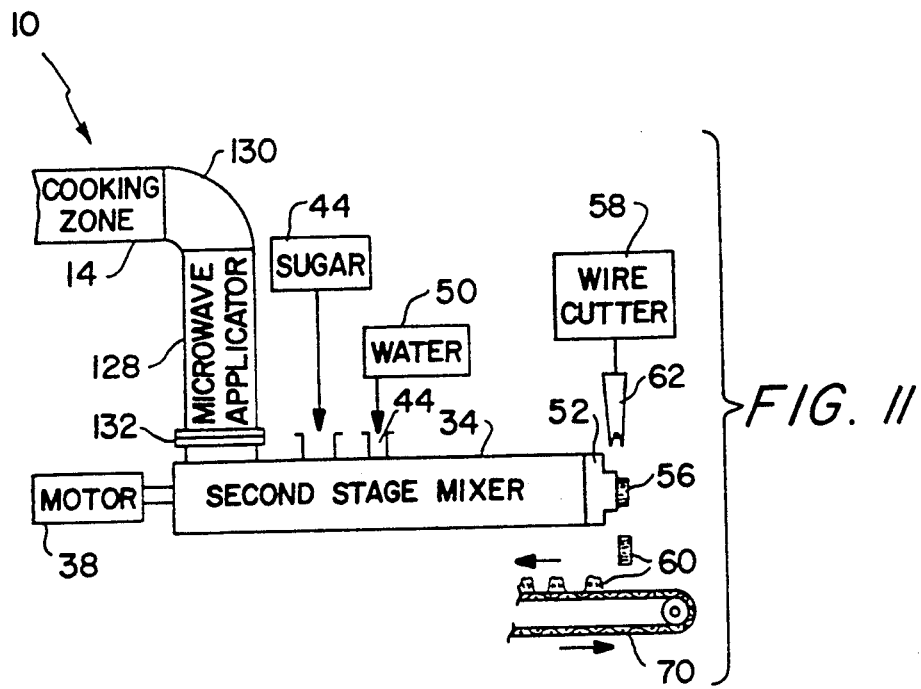
FIG. 11 is a schematic side view of a cooker extruder directly connected to a second stage mixer provided with a wire cutter.
Figure 12:
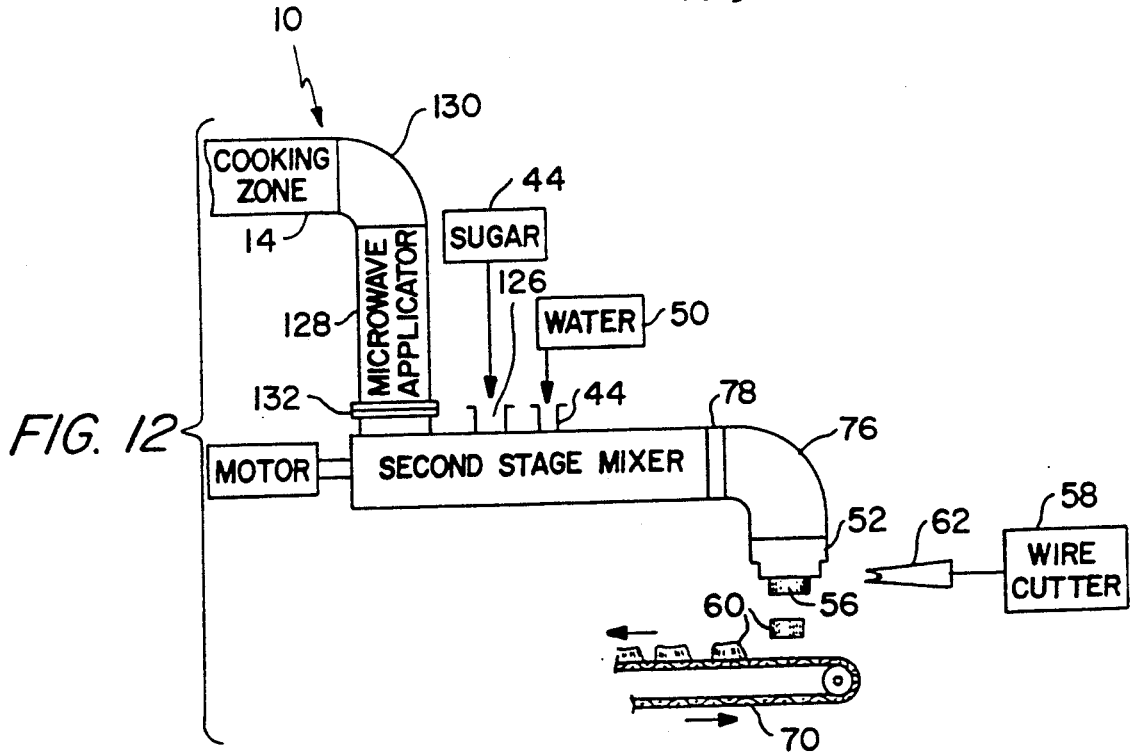
FIG. 12 is a schematic side view of a cooker extruder directly connected to a second stage mixer provided with a flow diverter and wire cutter.

The cooker extruder 10 and microwave applicator 128 can be directly connected to the second stage mixer 34, as illustrated in FIGS. 11 and 12. For example, a conveying conduit 130 such as an elbow can be connected between the cooker extruder 10 and the microwave applicator 128, positioned in a vertical orientation, with the microwave applicator 128 being directly connected to the second stage mixer 34 through a feed port provided with a connection 132. Alternatively, the elbow 130 can be fitted to the downstream end of the microwave applicator 128 when positioned in a horizontal arrangement and connected to the downstream end of the cooker extruder 10, similar to the arrangement illustrated in FIGS. 9 and 10. In these arrangements, the heat treated mass is fed directly into the second stage mixer 34.

Figure 13:
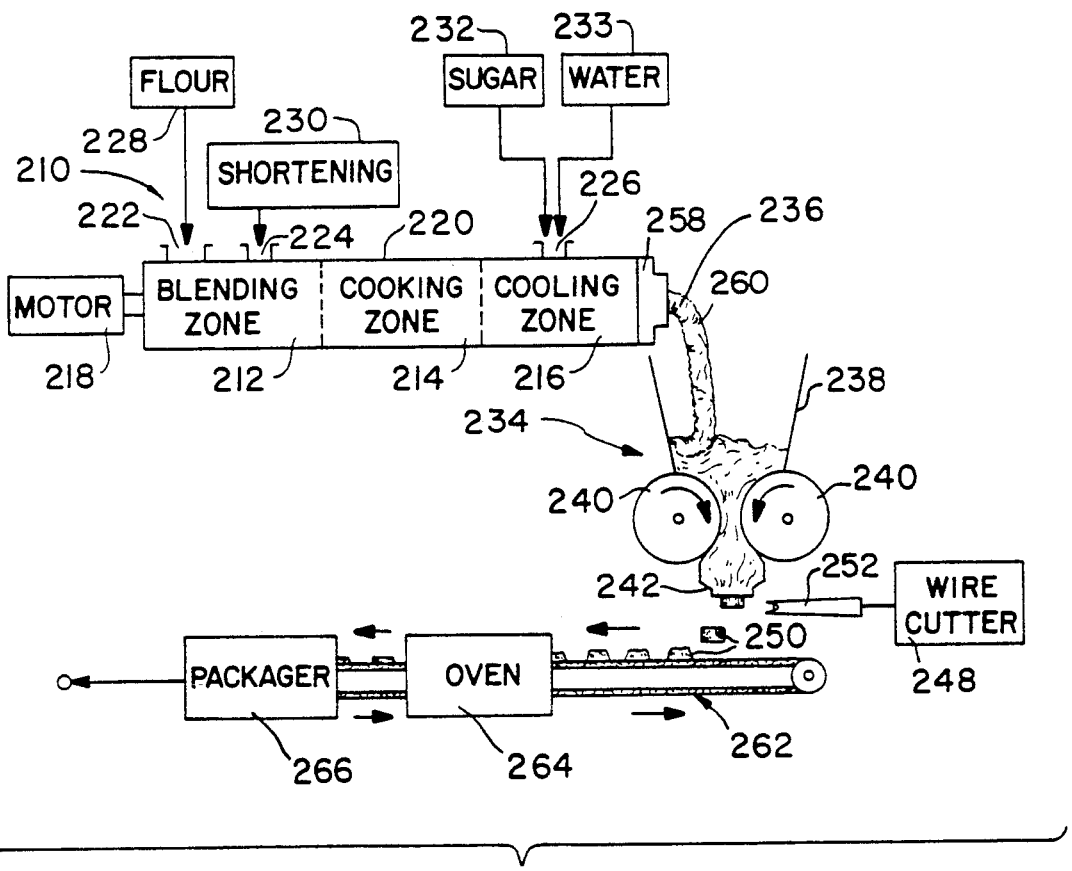
FIG. 13 is a schematic side view of a cooker extruder provided with an extruder die and a separate wire cut apparatus positioned adjacent thereto.

In embodiments of the present invention cookie products may be produced using a cooker extruder without a second stage mixer. As shown in FIG. 13, a cooker extruder 210 is diagrammatically illustrated so as to have a plurality of processing zones. For example, the cooker extruder 210 includes a "blending" zone 212, a "cooking" zone 214 and a "cooling" zone 216 disposed along the length of the cooker extruder 210. The cooker extruder 210 is provided with a drive or motor 218 for rotating at least one extruder screw (not shown) rotatably disposed within barrel 220 generally constructed of a plurality of barrel sections. In addition, the cooker extruder 210 can be fitted with one or more feed ports for adding cookie ingredients such as one or more types of flour, shortening, water, sugar, artificial sweetener, flavoring agents, vitamins, and other ingredients of a cookie dough formula to the cooker extruder 210, as indicated in FIG. 13.

More specifically, the cooker extruder 210 can be provided with a plurality of feed ports such as feed ports 222, 224, 226 for adding various ingredients at different positions and zones along the length of the cooker extruder 210. For example, one or more types of flour 228, sugar and other dry ingredients of the cookie dough mixture can be added through feed port 222, located at the "blending" zone 212. Shortening 230 or fat, such as vegetable oil, can be added slightly downstream relative to the addition of flour 228, through feed port 224.

In this embodiment, flour 228 and shortening 230 are added upstream relative to the "cooking" zone 214. Sugar 232 and water 233 can also be fed downstream relative to the "cooking" zone 214 through feed port 226 located at the "cooling" zone 216. In addition, heat-labile ingredients such as some artificial sweeteners, flavoring agents and vitamins can also be added downstream relative to the "cooking" zone 214 through feed port 226. Other ingredients such as a leavening agent can also be added to the cooker extruder 210, for example, through feed port 226.

The cooker extruder 210 can be provided with temperature control means such as by providing electrical resistance heaters (not shown) that supply heat energy, and fluid jackets (not shown) that supply or remove heat energy, as integral parts of or separate components of the barrel sections of the barrel 220. Preferably, each barrel section of the barrel 220 is provided with temperature control means so as to allow the temperature along the length of the cooker extruder 210, and accordingly the temperature of the cookie ingredients, to be precisely controlled. Temperature control by heat exchange between the barrel 220 and the fluid jackets, can be accomplished by circulating fluid such as water at a predetermined temperature from a source such as a steam generator for heating or water cooling system for cooling.

A separate wire cut apparatus 234 can be positioned at the downstream end of the cooker extruder 210 for receiving cookie mixture 236 from the cooker extruder 210. The wire cut apparatus 234 can comprise a hopper 238 provided with a pair of counter-rotating feed rollers 240 positioned at a lower portion thereof. The direction of rotation of the counter-rotating feed rollers 240 is indicated by arrows. Positioned below the counter-rotating feed rollers 240 can be provided a wire cutter die 242 having one or more die orifices for extruding one or more ropes 246. In an alternative arrangement of the wire cut apparatus, the counter-rotating feed rollers may be replaced with another type of feeding mechanism for feeding and forcing the dough-like cookie mixture through the die 242. For example, the counter-rotating feed rollers can be replaced with a spiral screw conveyor.

The wire cut apparatus is considered separate, since it is a separate component with respect to the cooker extruder. Further, the separate wire cut apparatus can be directly connected to the cooker extruder by a rigid connector such as a conveying conduit or connected directly to the hopper of the wire cut apparatus. Alternately, the wire cut apparatus can be fed by the cooker extruder by means of a conveyor. The dough-like cookie mixture can be gravity fed from the cooker extruder to a wire cut apparatus positioned below the downstream end of the cooker extruder as shown in FIG. 13.

The downstream end of the wire cut apparatus 234 after the die 242 is provided with a wire cutter 248 for cutting the rope(s) 246 into individual pieces 250. The wire cutter 248 can comprise a frame 104, as shown in FIG. 6, including a plurality of support arms 106 supporting a cutoff wire 108.

The downstream end of the cooker extruder 210 can be provided with an optional extruder die 258 for shaping and/or further extruding the cookie mixture into a rope 260, as illustrated in FIG. 13. The die 258 can have a single die orifice or can have many die orifices. The dough-like cookie mixture passing through the die 258 will become more compact and the rope 260 formed therefrom can be directed to the separate wire cut apparatus. The dough-like mixture may exit the extruder through a die having various shaped orifices such as circles, squares, slits, and the like.

The cooker extruder 210 can be arranged with the barrel 220 being substantially horizontally disposed, as illustrated in FIG. 13, so that the ingredients of the cookie mixture can be fed, for example, by gravity feeding the ingredients from above the cooker extruder 210. Further, the cookie mixture can be extruded in a substantially horizontal direction from the downstream end of the cooker extruder 210 by passing out the end of the horizontally disposed barrel 220 of the cooker extruder 210, or through the one or more substantially horizontally oriented die orifice(s) of the optional extruder die 258.

The substantially horizontal arrangement of the cooker extruder 210 allows gravity feeding of the cookie ingredients, as mentioned above, and facilitates maintenance and operation of the cooker extruder 210. However, other directional arrangements of the cooker extruder can be made with appropriate modification of the ingredient feeding arrangements, bearing arrangement and type of the cooker extruder, etc. For example, the cooker extruder can be mounted substantially vertically in a space-saving arrangement with the "cooking" zone 214 being positioned above the "cooling" zone 216.

A conveyor 262 can be positioned below and at the downstream end of the cooker extruder 210. The conveyor 262 uniformly receives individual pieces 250 and conveys them to a post extrusion baking device, such as an oven 264, and/or to a packager 266.

Figure 14:
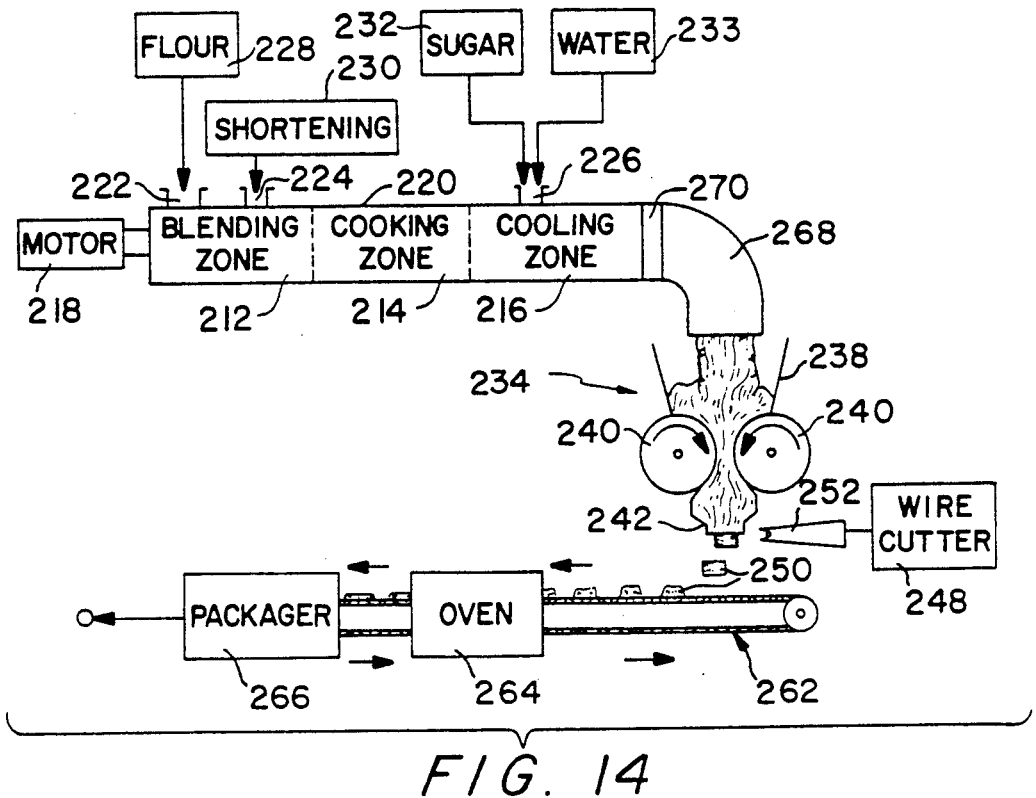
FIG. 14 is a schematic side view of a cooker extruder apparatus provided with an external flow diverter and a separate wire cut apparatus positioned adjacent thereto.

The downstream end of the cooker extruder 210 can be provided with a flow diverter to divert the flow of the cookie mixture moving through, exiting, or moving downstream relative to the cooker extruder 210. For example, an external flow diverter 268 can be connected to the downstream end of the cooker extruder, as illustrated in FIG. 14. Alternatively, the external flow diverter can be positioned in a flow path existing downstream relative to the cooker extruder such as by providing a conveying conduit between the cooker extruder 210 and the external flow diverter 268. The external flow diverter 268, for example, can be an elbow or other bent conduit fitted to the downstream end of the cooker extruder 210.

Figure 15:
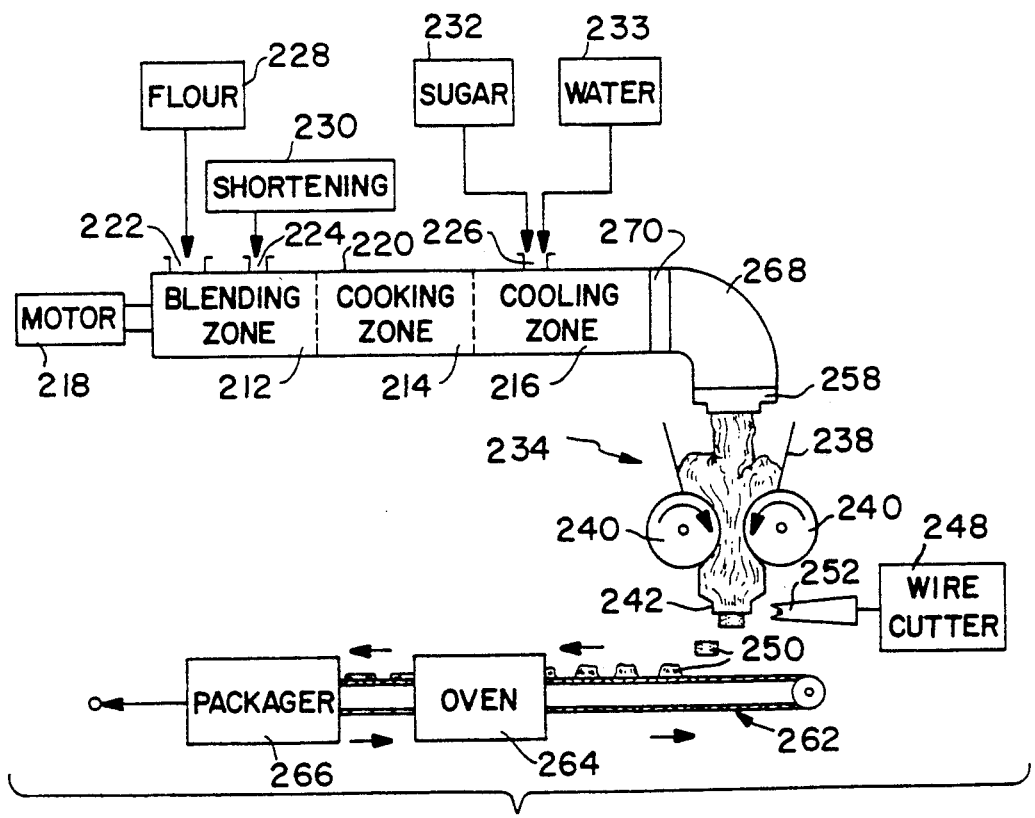
FIG. 15 is a schematic side view of a cooker extruder apparatus provided with an external flow diverter having an extruder die and a separate wire cut apparatus positioned adjacent thereto.

The downstream end of the external flow diverter 268 can be provided with an extruder die having one or more die orifices for shaping and/or further extruding the cookie dough-like mixture from the end thereof. For example, the downstream end of the flow diverter 268 can be fitted with an extruder die 258 having a single die orifice, as illustrated in FIG. 15. The provision of an extruder die tends to fill up the external flow diverter and prevent dead spots and condensation within the external flow diverter. Alternatively, other types of restriction devices such as a throttle valve can be implemented to achieve the same purpose.

To accommodate different shape and/or size flow paths through the barrel 220 of the cooker extruder 210 compared with that of the external flow diverter 268, a flow transition piece 270 can be provided between the barrel 220 and flow diverter 268, as illustrated in FIGS. 14 and 15.

Figure 16:
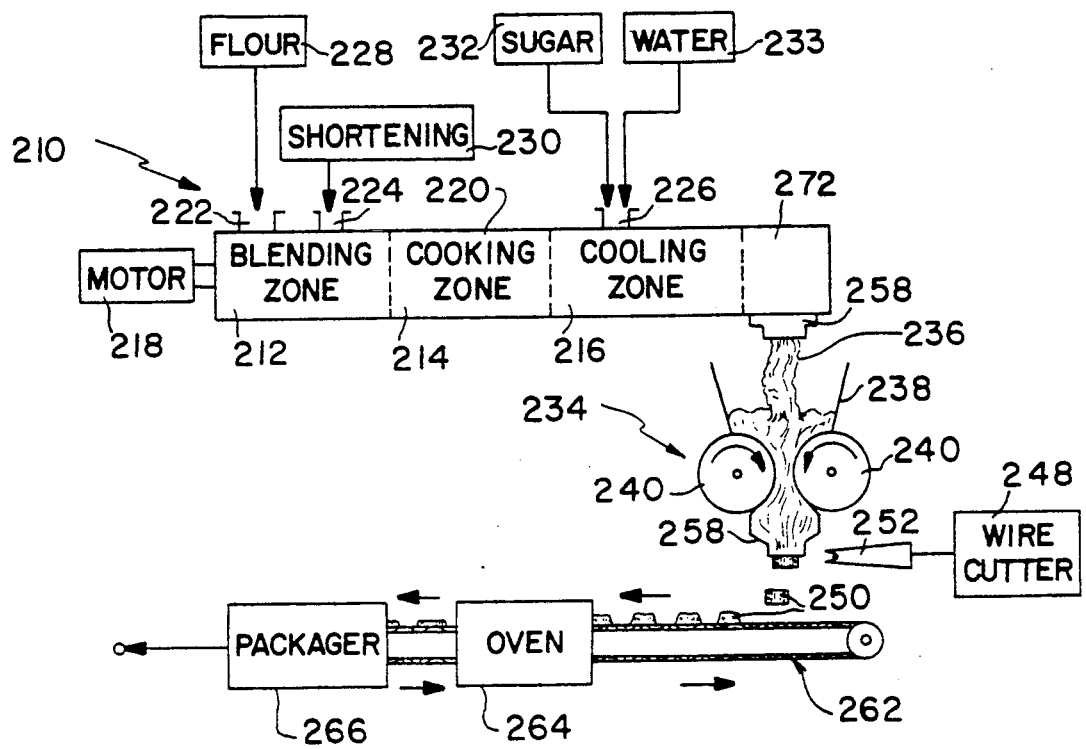
FIG. 16 is a schematic side view of a cooker extruder apparatus provided with an internal flow diverter and a separate wire cut apparatus positioned adjacent thereto.
Figure 17:
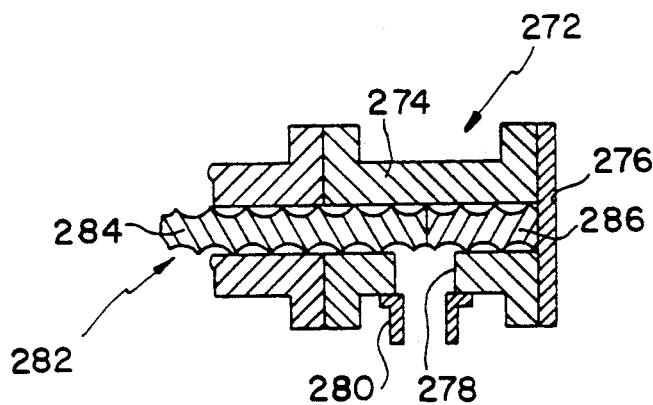
FIG. 17 is a partial detailed schematic cross-sectional side view of the downstream end of the cooker extruder apparatus provided with an internal flow diverter as illustrated in FIG. 16.

In a further embodiment, the downstream end of the cooker extruder 210 can be provided with an internal flow diverter 272. For example, a replacement or additional barrel section 274 having an end plate 276 and a downwardly extending exit port 278 can be positioned at the downstream end of the cooker extruder 210 to divert the flow of cookie mixture internally within the cooker extruder 210, as illustrated in FIGS. 16 and 17. The exit port 278 can be fitted with a die 280 having one or more die orifices for shaping and/or further extruding the cookie mixture 236. The cookie mixture is forced through the exit port 278 by extruder screw 282 having for example the combination of a conveying screw element 284 and a reverse conveying screw element 286, as shown in FIG. 17. A similar internal flow diverter may be provided for a second stage mixer 34 in place of the flow transition piece 78, flow director 76 and mixer die 52 shown in FIGS. 3 and 12, for example.

Figure 18:
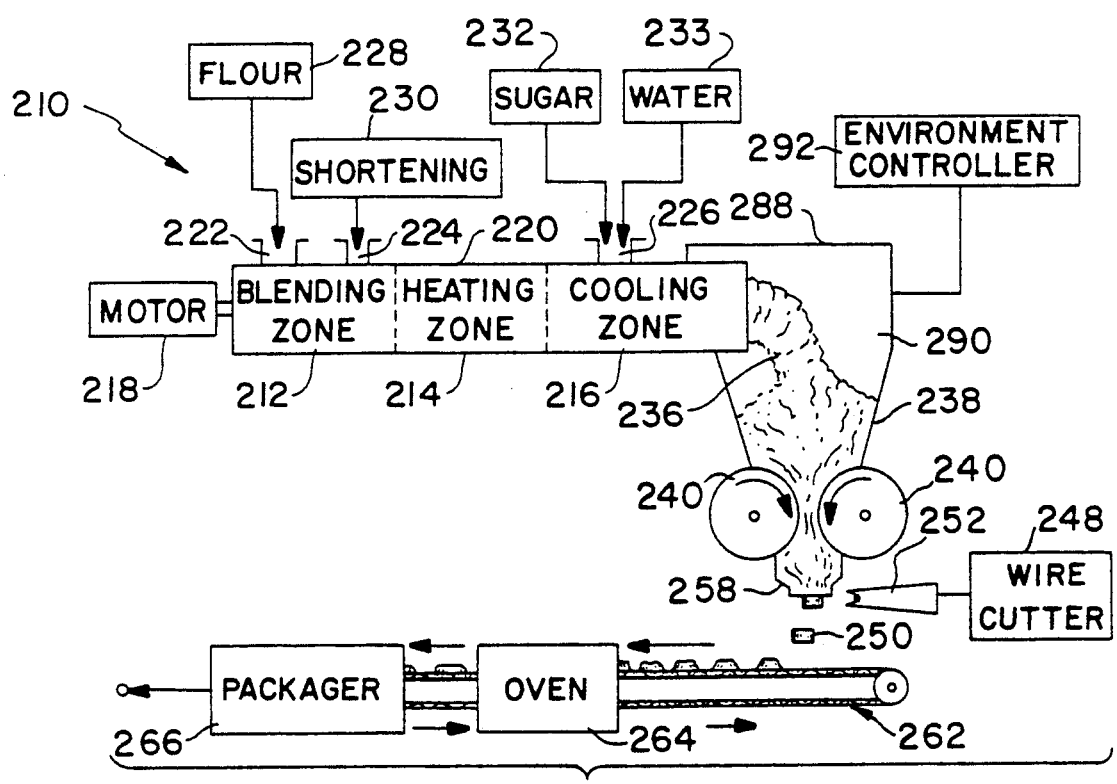
FIG. 18 is a schematic side view of a cooker extruder apparatus directly connected to a separate wire cut apparatus having an environmentally controlled enclosure.

Another embodiment of the present invention is illustrated in FIG. 18. In this embodiment, the hopper 238 of the wire cut apparatus can be provided with a lid 288 to form an enclosure 290. The pressure, temperature and humidity within the enclosure 290 can be controlled by an environment controller 292 to control the temperature, pressure, and moisture content of the cookie mixture 236 contained within the enclosure 290. The environment controller 292 includes temperature control means such as an electrical resistance heater (not shown) attached to the wall of the hopper 238 for adjusting or maintaining the temperature within the enclosure, pressure control means such as a compressor and/or vacuum pump connected to the hopper 238 through a pressure connection for adjusting or maintaining the fluid pressure within the enclosure 290 and humidity control means such as a water injection port, humidifier and/or dehumidifier connected by a conduit to the hopper 238 for adjusting or maintaining the humidity level within the enclosure 290. Further, the environment controller 292 includes controls and a control system for controlling the operation of the temperature, pressure and humidity control means independently or dependently.

Figure 19:
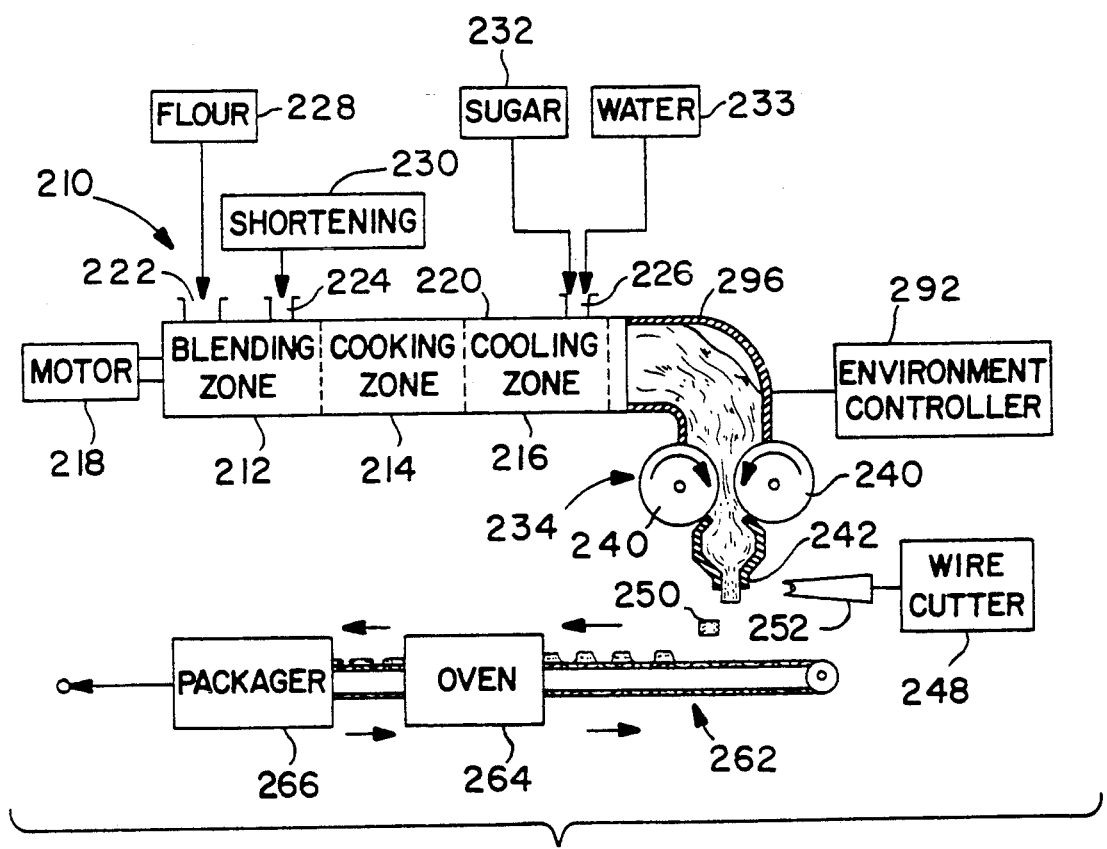
FIG. 19 is a schematic side view of a cooker extruder apparatus directly connected to a separate wire cut apparatus by a conveying conduit.

In an alternative arrangement to the cooker extruder 210 and wire cut apparatus 234 combination illustrated in FIG. 18, the hopper 238 can be replaced with a conveying conduit 296 such as an elbow as shown in FIG. 19.

In a further alternative arrangement, the cooker extruder 210 and wire cut apparatus 234, illustrated in FIG. 13, can be separated apart a distance with an environmentally controlled conveyor such as a belt or bucket conveyor enclosed within an environmentally controlled enclosure connecting the cooker extruder 210 with the wire cut apparatus 234.

Environment controllers and enclosures such as shown in FIGS. 18 and 19 may also be used to control the temperature, pressure, and moisture content of the cookie mixture 90 exiting the second stage mixer 34 shown in FIG. 5, for example.

In embodiments of the present invention, the extrudate may be wire cut at the cooker extruder die. The wire cutter may be attached to the extruder or adjacent to it. As shown in FIG. 20, a cooker extruder 310 is diagrammatically illustrated so as to have a plurality of processing zones. For example, the cooker extruder 310 includes a "blending" zone 312, a "cooking" zone 314 and a "cooling" zone 316 disposed along the length of the cooker extruder 310. The cooker extruder 310 is provided with a drive o motor 318 for rotating at least one extruder screw (not shown) rotatably disposed within barrel 320 generally constructed of a plurality of barrel sections.

The cooker extruder 310 can be provided with a plurality of feed ports such as feed ports 322, 324, 326 for adding various ingredients at different positions and zones along the length of the cooker extruder 310. For example, one or more types of flour 328, sugar and other dry ingredients of the cookie dough mixture can be added through feed port 322, located at the "blending" zone 312. Shortening 330 or fat, such as vegetable oil, can be added slightly downstream relative to the addition of flour 328, through feed port 324.

In this embodiment, flour 328 and shortening 330 are added upstream relative to the "cooking" zone 314. Sugar 332 and water 333 can also be fed downstream relative to the "cooking" zone 314 through feed port 326 located at the "cooling" zone 316. In addition, heat-labile ingredients such as some artificial sweeteners, flavoring agents and vitamins can also be added downstream relative to the "cooking" zone 314 through feed port 326. Other ingredients such as leavening agent can also be added to the cooker extruder 310, for example, through feed port 326.

The cooker extruder 310 can be provided with temperature control means such as by providing electrical resistance heaters (not shown) that supply heat energy, and fluid jackets (not shown) that supply or remove heat energy, as integral parts of or separate components of the barrel sections of the barrel 320. Preferably, each barrel section of the barrel 320 is provided with temperature control means so as to allow the temperature along the length of the cooker extruder 310, and accordingly the temperature of the cookie ingredients, to be precisely controlled. Temperature control by heat exchange between the barrel 320 and the fluid jackets, can be accomplished by circulating fluid such as water at a predetermined temperature from a source such as a steam generator for heating or water cooling system for cooling.

The cooker extruder 310 at the downstream end thereof can be provided with an extruder die 334 for shaping and/or further extruding the cookie mixture into a rope 336. The extruder die 334 can have a single die orifice as illustrated in FIG. 21, or can have plural die orifices as illustrated in FIG. 22.

A wire cutter 338, illustrated in FIG. 20, can be positioned at the downstream end of the cooker extruder 310 for cutting off individual pieces 340 from the rope 336 as it is being extruded from the die 334.

The wire cutter 338 can be constructed of a frame 342, as shown in FIG. 21, including two support arms 346, 348 holding a cutoff wire 350 under tension. The frame 342 can be slidably supported by a guide (not shown), and driven by an actuator (not shown) for reciprocating in a vertical direction.

A conveyor 352 can be positioned below and at the downstream end of the cooker extruder 310. The conveyor 352 receives individual pieces 340 and conveys them in a substantially uniform pattern to a post-extrusion baking device, oven 354, and/or a packager 356.

The cooker extruder 310 can be modified by replacing the extruder die 334, having a single die orifice with a manifold 358 having a plurality of die orifices, as illustrated in FIG. 22. The plural die orifices of the manifold 358 can have various shapes for extruding the cookie mixture 360 into various cross-sectional shapes. In the embodiment of FIG. 22, the ropes 360 exit the die orifices with the longitudinal axes of the ropes being vertically oriented.

As illustrated in FIGS. 23 and 24, the cooker extruder 310 may be provided with a die or manifold having at least one triangular shaped extruder die orifice 362 or at least one semi-circular shaped extruder die orifice 364, respectively. They may be used for extruding the cookie mixture into ropes having a triangular or semi-circular shaped cross section with the widest dimension being at the bottom of the rope upon exiting the die orifice.

Figure 25:
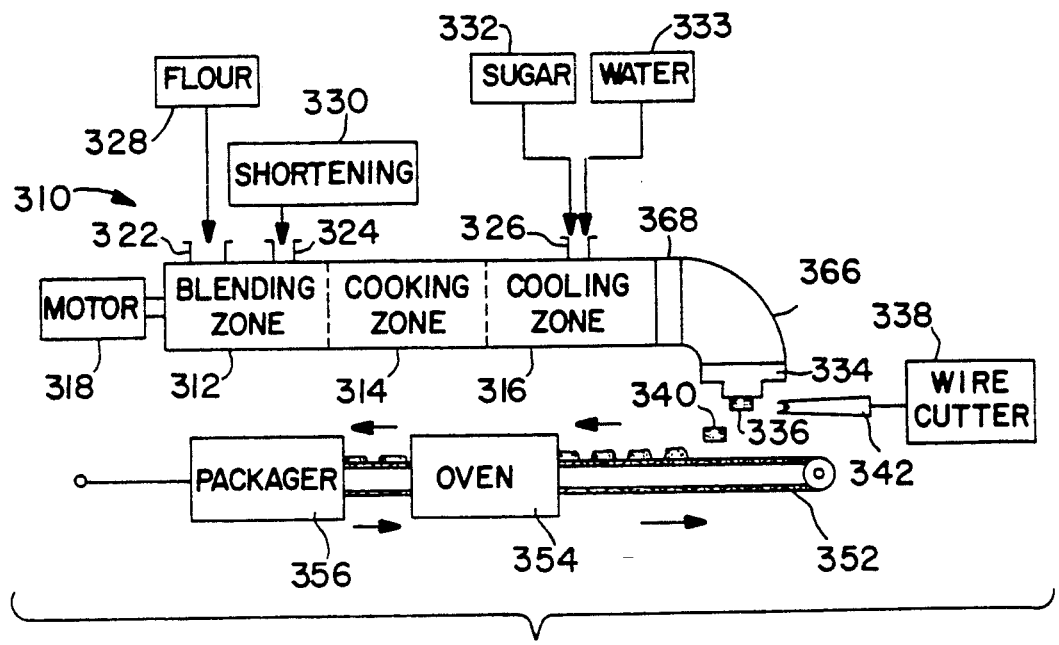
FIG. 25 is a schematic side view of a cooker extruder apparatus provided with an external flow diverter and wire cutter for cutting the extrudate at the die attached to the exit of the diverter.

In other embodiments, the downstream end of the cooker extruder 310 can be provided with an external flow diverter 366 such as an elbow for diverting the direction of the flow of the heat treated cookie mixture exiting the cooker extruder 310, as illustrated in FIG. 25. Further, examples of the flow diverter include a bent section of conduit, or a manifold for diverting and separating the flow into a plurality of separate flow paths. The flow diverter is considered external relative to the cooker extruder, since it is positioned in the mixture flow path downstream relative to the basic cooker extruder arrangement. More specifically, the flow diverter is positioned downstream relative to the end(s) of the extruder screw(s).

The flow cross section of the external flow diverter 366 can vary in size and shape with respect to the flow cross section of the cooker extruder 310. In the case of an external flow diverter 366 having a different flow cross section relative to the flow cross section of the barrel 320 of the cooker extruder 310, the cooker extruder 310 can be provided with a flow transition piece 368 for changing the size and/or shape of the flow cross section of the cooker extruder 310 to the size and/or shape of the flow cross section of the external flow diverter 366. For example, in the case of the cooker extruder being a twin screw extruder, a FIG. 8 to FIG. 0 (8-0) adapter can be provided to change the internal flow cross-sectional shape of an approximate FIGURE-8 of the twin screw extruder barrel to, for example, a circular cross section of a round flow diverting conduit.

Figures 26, 27, 28:
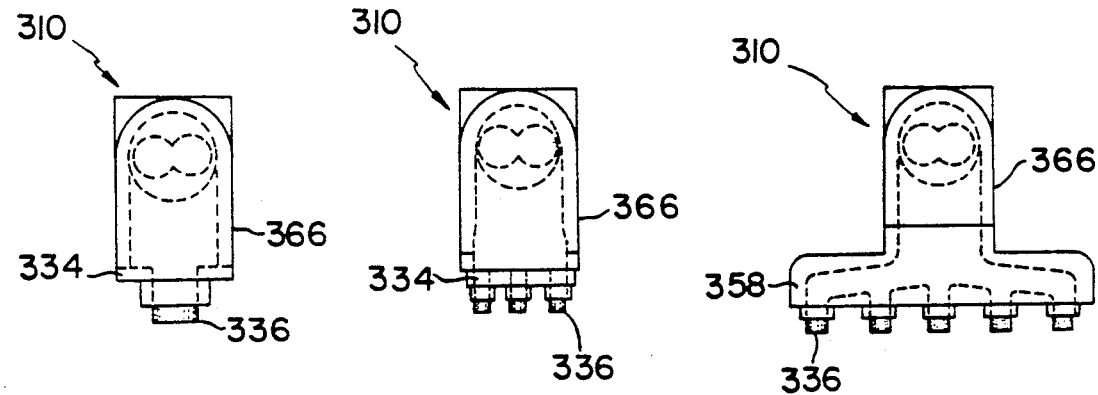
FIG. 26 is an end view of the downstream end of the cooker extruder apparatus illustrated in FIG. 25.
FIG. 27 is a schematic end view of another embodiment of the cooker extruder provided with a multiple orifice extruder die.
FIG. 28 is an end view of a further embodiment of the cooker extruder provided with a manifold having a plurality of die orifices.
Figure 29:
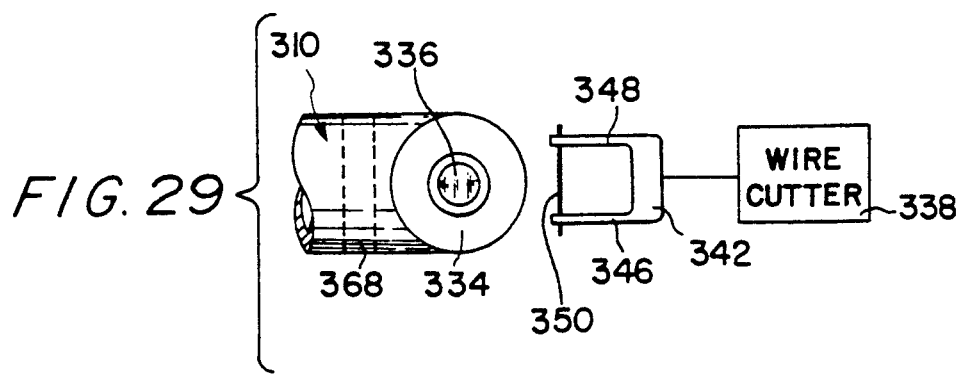
FIG. 29 is a partial bottom end view of the downstream end of the cooker extruder illustrated in FIG. 25.

The downstream end of the external flow diverter 366 can be fitted with the extruder die 334 having a die orifice for shaping and/or further extruding the cookie mixture into rope 336. The extruder die 334 can have a single die orifice, as illustrated in FIG. 26, or can have plural die orifices, as illustrated in FIG. 27. A dough cutting device, preferably a wire cutter 338 as illustrated in FIGS. 25 and 29, can be positioned at or downstream relative to the downstream end of the external flow diverter 366. In an embodiment with the wire cutter 338 located at the downstream end of the external flow diverter 366, the wire cutter 338 can cut off individual pieces 340 from the rope 336 a it is extruded from the extruder die 334.

In another embodiment of the cookie extruder as illustrated in FIG. 28, the downstream end of the flow diverter 366 can be provided with the manifold 358 having a plurality of die orifices for diverting and separating the flow path of the cookie mixture into a plurality of flow paths to form several ropes 336 having their longitudinal axes vertically oriented.

In an alternative embodiment, the downstream end of the cooker extruder 310 can be provided with an internal flow diverter 370 for changing the direction of flow of the cookie mixture within the barrel 320 of the cooker extruder 310, as shown in FIG. 30. The internal flow diverter 370 can be provided with an extruder die 334 having a single die orifice as shown in FIG. 31, or can have plural die orifices for shaping and/or further extruding the cookie mixture into ropes 336 as shown in FIG. 32.

The internal flow diverter 370, for example, can be a replacement or additional barrel section 72 attached to the downstream end of the barrel 20 of the cooker extruder 310, as illustrated in FIG. 17.

In other embodiments, the downstream end of the cooker extruder 310 of FIG. 20 can be provided with a sheet forming device such as the sheet forming die 110 of FIG. 7 for extruding the cookie mixture into a continuous sheet. As shown in FIG. 33, the downstream end of the sheet forming die 110 can be provided with a plurality of cutting wires 400 for cutting the continuous sheet into longitudinal strips, which can be cut into individual pieces by the wire cutter 438. The wire cutter 438 can comprise a frame 450, as illustrated in FIG. 33, including two support arms 452 supporting a cutoff wire 454. The wire cut pieces may be conveyed by the conveyer belt 352 to an oven 354 and packager 356 as illustrated in FIG. 25. Alternatively, the longitudinal strips produced by the cutting wires 400 can be cut into individual pieces by a separate cookie cutter such as cookie cutter 118 as illustrated in FIG. 7. The cookie cutter 118 can be any of a number of conventional cookie cutters such as a reciprocating cutter adapted for use in the present invention.

In the process of the present invention, a cooker extruder having two screws is preferably utilized. Preferably the screws of the extruder will be co-rotating, i.e., rotate in the same direction. Co-rotating twin screw elements, generally provide thorough mixing and conveying of the components, with the elements of one screw continuously wiping the other screw. This is particularly advantageous when the composition being mixed has a relatively high viscosity. Suitable extruders which may be used in the present invention include: (1) WENGER model series TX by Wenger of Sabetha, Kansas, (2) model series MPF by Baker Perkins, (3) model series BC by Creusot Loire of Paris, France, and preferably (4) model series ZSK or Continua by Werner and Pfleiderer. Single screw extruders includign those with a horizontally oscillating screw during rotation (i.e. a Buss kneader by Buss of Pratteln, Switzerland) may also be used in accordance with the present invention.

The post extrusion mixer may be at least one additional extruder or one or more commercially available continuous mixers. The post extrusion mixers may be operated in series or parallel to each other. A continuous mixer for use in the present invention comprises co-rotating screws and jacketed barrels with heating and/or cooling means. A continuous mixer is similar in construction to a cooker extruder except that for the same screw diameter, a continuous mixer has a greater free internal volume and thus operates to mix and convey ingredients at relatively lower pressures and shear than does an extrusion cooker to obtain a substantially homogeneous output. A continuous mixer which may be used in model ZPM-120 by Werner and Pfleiderer.

An extruder is preferable as the second stage mixing device when a pressure build up is required for shaping, as for example, through an extrusion die. The extruder also permits an axial exit of the extrudate for unidirectional continuous processing. On the other hand, in a high volume production environment, a continuous mixer is preferred to provide a higher volumetric throughput and a better heat transfer from the ingredients for efficient and rapid cooling. A continuous mixer also permits a more efficacious particulate feeding.

Screw configurations which may be used in embodiments of the present invention where a cooker extruder is used in combination with a post extrusion mixer are disclosed in copending U.S. patent application Ser. No. 07/362,579 entitled "Extruder And Continuous Mixer Arrangement For Producing An At Least Partially Baked Product Having A Cookie-Like Crumb Structure" filed in the name of Bernhard Van Lengerich on June 7, 1989. The disclosure of the latter application is incorporated herein by reference in its entirety. Screw configurations which may be used in the present invention with a model ZSK-57 twin screw cooker extruder are shown in FIGS. 4 and 6 of said application. Screw configurations which may be used in the present invention with a second stage or post extrusion mixing device are shown in FIGS. 5 and 7 of said application. The FIG. 5 screw configuration may be used where the second stage mixing device comprises an extruder. The FIG. 7 screw configuration may be used with a model ZSK-120 continuous mixer as the second stage mixing device.

In embodiments of the present invention where a cooker extruder is used without a post extrusion mixer, a preferred screw configuration which may be used with a Werner and Pfleiderer model ZSK-57 twin screw cooker extruder is disclosed in copending U.S. patent application Ser. No. 07/362,375 entitled "Extruder Apparatus For Producing An At Least Partially Baked Product Having A Cookie-Like Crumb Structure," filed in the name of Bernhard Van Lengerich on June 7, 1989. The disclosure of the latter application is incorporated herein by reference in its entirety.

The extruder throughput or mass flow rates utilized in the present invention with a Werner and Pfleiderer ZSK-57 twin screw cooker extruder are generally from bout 150 lbs/hr to about 850 lbs/hr of extrudate. Higher rates may be achieved with other models. For example, a throughput rate of 6000 lbs/hr may be achieved using a Werner and Pfleiderer model Continua 120 cooker extruder.

In the present invention, the flour component may be any comminuted cereal grain or edible seed meal, derivatives thereof and mixtures thereof. Exemplary of the flour components which may be used are wheat flour, corn flour, oat flour, barley flour, rye flour, rice flour, potato flour, grain sorghum flour, corn starch, physically and/or chemically modified flours or starches, such as pregelatinized starches, and mixtures thereof. The flour may be bleached or unbleached. Wheat flour or mixtures of wheat flour with other grain flours are preferred. The amount of flour used in the compositions of the present invention ranges, for example, from about 30% by weight to about 70% by weight, preferably from about 45% by weight to about 55% by weight. Unless otherwise indicated, all weight percentages are based upon the total weight of all ingredients forming the dough-like mixtures or formulations of the present invention except for inclusions such as flavor chips, nuts, raisins, and the like. Thus, "the weight of the dough-like mixture" does not include the weight of inclusions.

The flour may be replaced in whole or in part by flour substitutes or bulking agents such as, polydextrose, hollocellulose, microcrystalline cellulose, mixtures thereof, and the like. Corn bran, wheat bran, oat bran, rice bran, mixtures thereof, and the like, may also be substituted in whole or in part for the flour for making a fiber enriched product, to enhance color, or to affect texture.

Corn flour and/or wheat bran may be used, for example, to enhance color and affect texture. Exemplary amounts range up to about 15% by weight corn flour and up to about 20% by weight wheat bran, the percentages being based upon the total weight of ingredients forming the dough-like mixture. Preferably, the corn flour and wheat bran will each comprise from about 1 to about 10% by weight, more preferably from about 2% by weight to about 5% by weight, based upon the weight of the dough-like mixture.

The shortening or fat used in the present invention may be any edible fat or oil or mixture thereof suitable for baking applications and may include conventional food-grade emulsifiers. Vegetable oils, lard, marine oils, and mixtures thereof which are fractionated, partially hydrogenated, and/or interesterified are exemplary of the shortenings or fats which may be used in the present invention. Edible reduced or low calorie, or non-digestible fats, fat substitutes, or synthetic fats, such as sucrose polyesters which are process compatible may also be used. The shortenings or fats may be solid or fluid at room temperatures of from about 75° F. to about 90° F. The use of components which are solid or semi-solid at room temperatures are preferred so as to avoid possible oil seepage from the final product during storage. The shortening or fat component is preferably added to the extruder in the form of a heated oil to facilitate metering, mixing, and a fast heat up of the added ingredients.

Generally, the amount of the shortening or fat component admixed with the flour component is, for example, at least about 12% by weight, and may, for example, go up to about 40% by weight, based upon the weight of the dough-like mixture. It preferably ranges from about 20% by weight to about 30% by weight, based upon the weight of the dough-like mixture.

Exemplary emulsifiers which can be used include lecithin, sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactate. Exemplary amounts are up to about 3% by weight of one or more emulsifiers based upon the weight of the flour.

Process compatible ingredients which can be used to modify the texture of the products produced in the present invention include sugars such as sucrose, fructose, lactose, dextrose, galactose, maltodextrins, corn syrup solids, hydrogenated starch hydrolysates, protein hydrolysates, mixtures thereof, and the like. Reducing sugars, such as fructose, maltose, lactose, and dextrose or mixtures of reducing sugars may be used to promote browning. Fructose is the preferred reducing sugar, because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as sugar may be admixed with the other ingredients in either solid or crystalline form, such as crystalline or granulated sucrose, granulated brown sugar, or crystalline fructose, or in liquid form, such as sucrose syrup or high fructose corn syrup. Humectant sugars, such as high fructose corn syrup, may be used to promote chewiness in the post-extrusion baked product.

In embodiments of the present invention, the total sugar solids content, or the texturizing ingredient content, of the dough-like mixtures of the present invention is, for example, at least about 10% by weight, and may, for example, go up to about 40% by weight, based upon the weight of the dough-like mixture. It preferably ranges from about 20% by weight to about 30% by weight, based upon the weight of the dough-like mixture.

Crystalline or granulated sucrose alone or with other sugars is preferred in the present invention. The sucrose content may, for example, be at least about 80% by weight, based upon the total sugar solids content of the dough-like mixture. The balance of the sugar solids may comprise fructose, dextrose, lactose, or mixtures thereof, for example. Sugar granulations which may be used range, for example, from about 4× to about 12X.

The moisture contents of the dough-like mixtures of the present invention should be sufficient to provide the desired consistency to enable proper forming, machining, and cutting of the dough. The total moisture content of the dough-like compositions of the present invention will include any water included as a separately added ingredient, as well as the moisture provided by flour (which usually contains about 12% to about 14% by weight moisture), and the moisture content of other dough additives included in the formulation, such as high fructose corn syrup, invert syrups, or other liquid humectants.

Taking into account all sources of moisture in the dough-like mixture including separately added water, the total moisture content of the dough-like mixtures of the present invention is generally less than about 20% by weight, preferably less than about 15% by weight, more preferably less than about 10% by weight, based upon the weight of the dough-like mixture. The dough-like compositions of the present invention generally have a water or moisture content of at least about 5% by weight, based upon the weight of the dough-like composition.

Generally, if the amount of added water is too low, the extrudate will tend to be slurry-like and cannot be cut into pieces. As the amount of water is increased the extrudate consistency increases, until a threshold level is reached. At this level, additional water reduces the consistency. However, as the amount of water is increased to reduce the consistency, there is an increased risk of substantial oil separation and extruder surging. The lower the pressure and/or temperature to which the heat treated mass is subjected to after water addition: the lower is the risk. Thus, adding an extrusion die to the extruder or to the post extrusion mixer: a) increases the pressures encountered by the ingredients in the extruder or post extrusion mixer which, b) increases the risk that the addition of water beyond the amount needed to reach the threshold level of consistency will result in oil separation which can reduce machinability.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). The strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample dimensions can be about 1 inch square and ¼ inch high, or thick. The sample temperature can be room temperature (about 70°–75° F.) or higher. The more force required to penetrate the sample, the greater is its modulus and the greater is its consistency.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder, the post extrusion mixer, or in post extrusion forming operations and to reduce post extrusion baking times, it is generally preferred that the amount of water added be less than the amount needed to reach the threshold or maximum consistency. Thus, it is generally preferred that the water content of the dough-like mixture is such that additional water will increase the consistency of the dough-like mixture.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

In preferred embodiments of the present invention, the amount of water admixed with the heat treated mass may range, for example, from about 0.5% by weight to about 10% by weight, based upon the weight of the dough-like mixture. Depending upon the time and intensity of heat treatment and the consistency needed for shaping or forming, and the pressures involved, it may be more preferably from about 2% by weight to about 6% by weight, based upon the weight of the dough-like mixture.

The added water may be in the form of pure or tap water, a liquid source of water, such as sucrose syrup, corn syrup, high fructose corn syrup, eggs, honey, molasses, mixtures thereof, and the like, alone or in combination with a dry source of water, such as the moisture content of dried eggs, corn syrup solids, and the like. Water, in the form of tap water or a liquid source of water, such as high fructose corn syrup, for example, may also be added in the heat treating stage. It may be added with the flour for example, in low amounts (e.g. less than about 2% by weight, based upon the weight of the dough-like mixture) which do not result in: a) substantial oil separation or extruder surging or, b) substantial starch gelatinization.

In addition to the foregoing, the dough-like mixtures of the invention may include other additives conventionally employed in cookies. Such additives may include, for example, milk by-products, egg or egg by-products, cocoa, vanilla or other flavorings, as well as inclusions such as nuts, raisins, coconut, flavored chips such as chocolate chips, butterscotch chips and caramel chips, and the like.

A source of protein which is suitable for inclusion in baked goods may be included in the dough-like compositions of the present invention to promote Maillard browning. The source of protein includes non-fat dry milk solids, dried or powdered eggs, mixtures thereof, and the like. The amount of the proteinaceous source may, for example, range up to about 5% by weight, based upon the weight of the dough-like mixture.

The dough-like cookie compositions of the present invention may contain up to about 5% by weight of a leavening system, based upon the weight of the dough-like mixture. Chemical leavening agents or injected gases such as carbon dioxide can be used, but are not necessary for leavening the dough-like compositions of the present invention. Leavening action may be achieved by post extrusion heating of the composition which is sufficient to vaporize water in the dough-like cookie composition. However, the leavening agents may be used to adjust or control the degree of leavening and/or to control the pH of the cookie products.

The inclusion of a leavening agent or other edible pH-adjusting agents may promote browning of the cookie mixture during processing within the extruder or during post-extrusion mixing and heating. A desired pH for the cookies or the dough-like mass is from about 5 to about 9.5, preferably from about 7 to 8.5. Generally, the more alkaline the composition, the greater the degree of browning. However, the pH should be adjusted so as not to adversely affect taste of the final product. A higher pH may be used to promote browning when forming the heat treated mass of the present invention, followed by adjustment of the pH after and/or during cooling of the heat treated mass. Exemplary of chemical leavening agents or pH adjusting agents which may be used include alkaline materials and acidic materials such as sodium bicarbonate, ammonium bicarbonate, sodium acid pyrophosphate, tartaric acid, mixtures thereof, and the like.

In the process of the present invention, the flour component and shortening or fat are continuously and separately fed into the upstream portion of a cooker extruder. One or more crystalline or granulated sugars may be continuously added or preblended with the flour. However, continuous separate addition of the crystalline sugar to the upstream end of the extruder is preferred to avoid particle separation in the dry blend.

The flour component, the shortening or fat, and the sugar components are generally initially conveyed in the extruder with cooling or without the application of external heat. They are conveyed and admixed while being heated to obtain a heat treated mass.

In the present invention, the ingredients may be heated to temperatures above the minimum gelatinization temperature of the starch (assuming that a sufficient amount of water was available for reaction with the starch) but no or substantially no gelatinization (measured by differential scanning calorimetry) occurs. It is desirable that the oil sufficiently coats the starch containing flour particles to prevent substantial penetration of moisture into the starch granules so as to avoid substantial gelatinization.

A cookie crumb-like structure is obtained by avoiding substantial starch gelatinization. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomenon," *Cereal Foods World*, Vol. 33, No. 3, Pgs. 306–311 (March 1988).

In the present invention, conditions under which no or substantially no gelatinization is preferably achieved are by embedding or coating the starch carrying ingredients, such as wheat flour, within the oil and then adding the water to the flour and oil mass. No or substantially no gelatinization may also be further assured by: a) reducing or substantially eliminating the addition of water, and/or b) admixing the water with the heat treated mass below the minimum temperature at which starch gelatinization can occur.

In the process of the present invention, heating of the flour, shortening or fat, and sugar at as high a temperature as possible and for as long as possible for a maximum throughput rate without burning or other deleterious effects, is generally desirable for the development of browning and flavor. Maillard browning and flavor development involve the reaction between a reactive carbonyl group of a carbohydrate and a primary amino acid of the composition. The reaction proceeds through a series of intermediate reactions to finally produce the brown nitrogenous polymers. The heat treating step is believed to at least develop precursors to the polymeric nitrogen containing compounds. During the post-extrusion baking step, the colors develop faster than an uncooked dough under similar baking conditions.

The flour component, shortening or fat component, and optionally the sugar or other texturizing components are heated in the cooker extruder generally to a temperature of at least about 150° F., preferably at least about 200° F., more preferably at least about 250° F., and most preferably from about 300° F. to about 500° F. The average residence time for the flour, shortening or fat, and optional sugar components at these elevated temperatures in the extruder is, for example: a) from about 25 seconds to about 150 seconds when a post extrusion mixer is used, and b) from about 15 seconds to about 90 seconds when a post extrusion mixer is not used.

The heat treated mass is formed at a relatively low pressure within the cooker extruder. Pressures during the heat treating stage are generally less than about 20 bars absolute, preferably less than about 10 bars absolute. It is believed that the use of low pressures in the cooker extruder reduces the tendency for oil to separate from the remaining cookie ingredients. Preferably, substantially no frictional heating occurs in the cooker extruder. Substantially all of the heating is preferably supplied by external or jacketed heating means. Generally, the work done in the production of the heat treated mass and dough-like mixture is low, for example, less than about 40 watt hrs/kg (or less than about 18 watt hrs/lb).

The heat treated mass temperature before and/or during admixing with water or a liquid source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

In embodiments where a post extrusion mixer is used, the cooling of the heat treated mass may begin in the extruder or after extrusion. Post extrusion cooling is preferred because it provides for longer residence times at elevated temperatures in the extruder for flavor and color development. The use of substantially the entire maximum available length of the extruder to heat treat the ingredients comprising oil, flour and optionally, at least one texturizing ingredient such as sugar, permits significant production of browning and flavor components. It further substantially reduces the amount of post extrusion heat treatment required for final baking of the output product.

Also, thermal stress on the extruder screws may be reduced by maintaining a more even temperature profile in the extruder. The separation of the heat treatment zone of the first stage extruder from the lower temperature operation of the second stage mixing apparatus also eliminates the loss of heat by conduction through the screw shafts and the screw elements because the screw shafts of the first and second mixing stages are physically separate from one another.

If the heat treated mass temperature is too low upon and/or during admixing it with the water or liquid source of water, viscosity may deleteriously increase. This may result in mixing difficulties, pressure increases, and substantial oil separation and extruder surging. Additionally, the less cooling performed within the cooker extruder and within the post extrusion mixer (when used), the less is the amount of post extrusion heating needed for leavening.

If pressures are sufficiently low (such as when an extruder die is not utilized) and if the mass temperature during heat treatment is sufficiently low, no or substantially no cooling may be needed to avoid substantial oil separation or extruder surging. However, higher heat treated mass temperatures are preferred for: 1) the promotion of browning and flavor development, and 2) reduced post extrusion heating times. Thus, it is generally preferred that the heat treated mass be heated to a high temperature, for example about 300° F. to about 500° F., and that the heat treated mass temperature be reduced, as needed to avoid substantial oil separation or extruder surging, before and/or during admixing it with water or a liquid source of water. Cooling of the heat treated mass is preferably initiated prior to and continues during admixing it with water or a liquid source of water to reduce the risk of substantial oil separation upon mixing or extrusion.

Preferably, the heat treated mass temperature upon addition of water or a liquid source of water is from about 100° F. to about 300° F, more preferably from about 110° F. to about 212° F. Generally, the heat treated mass undergoes a temperature drop of at least about 35° F., preferably at least about 50° F. before and/or during admixing it with the water or liquid source of water. The heat treated mass is preferably cooled to a temperature below the boiling point of water (212° F.), more preferably to a temperature lower than about 200° F., most preferably less than about 150° F. before or during admixing it with the water or liquid source of water to reduce the risk of substantial steam generation, and substantial oil separation and extruder surging. Admixing the water or liquid source of water with the heat treated mass at a mass temperature which is lower than the minimum gelatinization temperature of the starches included in the formulation may further assure that no or substantially no starch gelatinization occurs, particularly as the amount of water is increased.

At the exit end prior to or at the optional extruder die or optional post extrusion mixer die, which is generally the point of maximum pressure, the temperature of the dough-like mixture which is formed in the cooker extruder or in the post extrusion mixer should be less than the boiling point of water (212° F.), more preferably less than about 200° F., most preferably less than about 150° F. Generally, the temperature of the heat treated mass and dough-like mixture in the extruder or post extrusion mixer should not be reduced to below about 100° F., for example, to avoid mixing difficulties, increased pressure, or increased risk of substantial oil separation or extruder surging due, for example, to increased viscosity or oil solidification. Also, excessively low extrudate temperatures may impair post extrusion forming, shaping, and cutting operations. Increased post extrusion heating times and/or temperatures for leavening purposes also result from excessive cooling.

In producing the dough-like mixtures in accordance with the present invention it is preferred that substantially no moisture content reduction occurs and that the dough-like mixture retains a sufficient amount of water for proper leavening during post extrusion heating.

All or a portion of the texturizing ingredient, such as solid, crystalline or granulated sugar, may be admixed with the cooled heat treated mass at the same or at a different location from addition of the water or other aqueous source to control the texture of the final baked product.

Addition of a solid, crystalline or granulated sugar, such as sucrose, and subjecting it to high extrusion temperatures tends to promote sugar melting and/or dissolution and thus a crunchy texture in the final product. Addition of all or a portion of the crystalline sugar to the cooled mass rather than subjecting it to high extrusion temperatures tends to avoid excessive sugar melting, and/or solubilization and promotes a tender texture in the final product. Thus, all, a portion (e.g. about 15% to about 85% by weight, based upon the total amount of solid, crystalline or granulated sugars), or none of the solid or crystalline sugars may be subjected to the heat treating stage to control texture in the final, post extrusion baked product.

Also, the greater the degree, or portion of sugar melting and/or dissolving, the less the viscosity of the extrudate. Accordingly, the relative amounts of solid or crystalline sugar: a) subjected to heat treatment upstream, and b) subjected only to the downstream cooling stage may be used to control the extrudate viscosity for subsequent forming or machining, and/or to control the texture of the final baked good.

The downstream or second stage addition of a texturizing ingredient, such as sugar, reduces the mass subjected to heat treatment which permits heating of the upstream or first stage ingredients to a higher temperature at a given throughput rate. Also, the downstream addition of the texturizing ingredient such as sugar, which is at a relatively low temperature (e.g. about room temperature) helps to cool the heat treated mass.

Various granulations may also be used to control the degree of sugar melting and/or dissolving, with larger sizes tending to result in less melting or dissolving. The addition of liquid sugar, such as sucrose syrup, may additionally promote crunchiness of the final product.

The residence time of the added liquid water or added liquid source of water, as well as the residence time of the texturizing ingredient, such as sugar, added downstream after initiation of the reduction of the heat treated mass temperature should be sufficient to enable the attainment of a substantially homogeneous dough-like mixture. The residence time in the cooling or reduced temperature stage should also be sufficiently long to reduce the mass temperature so as to avoid substantial expansion or puffing of the dough-like mass upon extrusion. The average residence time in the post extrusion mixer of the water and crystalline sugar added to the heat treated mass may, for example, be from about 60 seconds to about 180 seconds. When a cooker extruder is used without a post extrusion mixer, the average residence time in the cooker extruder of the water and crystalline sugar added to the heat treated mass may, for example, be from about 10 seconds to about 60 seconds.

In embodiments of the present invention where a post extrusion mixer is used, the heat treated mass upon exiting the cooker extruder may be further heated to promote further browning and flavor development and to reduce the amount of post extrusion heating needed for final baking of the output product provided that adverse oil separation or extruder surging does not occur. This further heating may be up to an additional 200° F. for a short period of time, e.g. 5-20 seconds. For example, a microwave heating device may be placed between the extruder and the post extrusion mixer for heating the heat treated mass before it enters the post extrusion mixer. The minimal amount of final baking required due to the use of the entire length of the extruder for heat treatment and the further use of the microwave applicator permits the addition of heat sensitive ingredients to the formulation, for example, through a downstream feed port in the post extrusion mixer.

A microwave applicator which may be used is disclosed in copending U.S. patent application Ser. No. 441,230 entitled "Extruder And Continuous Mixer Arrangement For Producing An At Least Partially Baked Product Having A Cookie-Like Crumb Structure The Extruder Including A Microwave Applicator" filed in the name of Bernhard Van Lengerich on Nov. 22, 1989, which is a continuation of U.S. application Ser. No. 07/362,374, filed on June 7, 1989 and now abandoned. The disclosures of the applications are incorporated herein by reference in their entireties. As disclosed therein, the microwave applicator is formed as a continuation of the screw channel at the downstream most end of the extruder. The screw channel beyond the screw elements and within the microwave applicator is conformed to a round channel surrounded by a source of microwave energy. The residence time of the ingredients within the microwave applicator is relatively short, e.g. about 5-20 seconds.

Just prior to extrusion, or upon extrusion through an extruder die, the dough-like mixture formed in the extruder or in the post extrusion mixer may be heated, for example, by about 5° F. to about 30° F. This heating may be used to adjust dough consistency or viscosity provided that adverse oil separation or extruder surging does not occur. The post cooling heating may be used, for example, for controlling flow in the die, particularly at low moisture contents.

The pressure in the cooling stage is generally less than about 20 bars absolute, preferably less than about 10 bars absolute. The pressure drop across the extrusion die is generally less than about 20 bars and preferably less than about 10 bars. Low pressures are preferred to avoid separation of oil from the remaining mass and to avoid surging.

The leavening agents or pH adjusters may be added to the cooled mass in the cooling stage or they may be added prior to the cooling stage. They may be added in dry form either separately or as a pre-blend with the flour or solid or crystalline sugar, for example. They may also be added in aqueous form separately or as part of the added water. Emulsifiers may suitably be added with the shortening or fat in the heating stage or with the water in the cooling stage of the process of the present invention.

Ingredients which promote Maillard browning, such as proteinaceous materials and reducing sugars are preferably added in the heat treating stage. The dry ingredients may, for example, be preblended with the flour or added separately. The proteinaceous materials and the reducing sugars may also be added in the cooling stage depending upon the degree of browning desired, and the water content of the ingredients. These ingredients, as well as any other additives in dry form may be preblended with the upstream or downstream sugar, for example, or added separately therefrom. Likewise, additives which are in liquid form may be preblended with the added water or liquid source of water or they may be separately added to the extruder and/or post extrusion mixer. Generally, preblending of minor ingredients for addition to the extruder and/or post extrusion mixer is preferred for achieving homogeneity.

Heat labile ingredients, such as various vitamins, minerals, flavorings, coloring agents, sweeteners, such as aspartame, and the like, are preferably added in the cooling stage so as to reduce the possibility of thermal decomposition or degradation. The heat labile ingredients may, for example, be preblended with sugar added downstream in the cooling stage or with the added water. They may also be added separately, for instance downstream of the sugar or water addition.

Shear sensitive ingredients, such as chocolate chips or other flavored chips, raisins, nuts, fruit pieces or other inclusions or particulates are preferably added to the cooling stage. The shear sensitive ingredients are most preferably added downstream of the downstream sugar and water addition. Adding the shear sensitive ingredients near the exit or in the last barrel section of the post extrusion mixer (or extruder when used without a post extrusion mixer) serves to maintain particle integrity by reducing their exposure to the mechanical action of the screw elements. Flavor chips, such as chocolate chips may be added at temperatures below room temperature, for example at about 20° F. to about 65° F. so as to reduce melting of the chips in the dough-like mixture.

Generally, in embodiments where a post extrusion mixer is used, the heat treated mass is extruded from the cooker extruder without substantial moisture loss or flashing, such as would cause substantial expansion or puffing, because of the low water content of the mass and the low pressure drop upon exiting the extruder. Generally, a die is not used with the cooker extruder. The extrudate from the cooker extruder may be dropped or conveyed into the inlet of a continuous post-extrusion mixer.

The dough-like mixture is extruded from the post extrusion mixer to obtain an extrudate without substantial moisture loss or flashing because the temperature of the dough-like mixture exiting the post extrusion mixer is less than about 212° F.

When a post extrusion mixer is not used in embodiments of the present invention the dough-like mixture is likewise extruded from the cooker extruder to obtain an extrudate without substantial moisture loss or flashing because the temperature of the dough-like mixture exiting the extruder is less than about 212° F.

The extruded dough-like mixtures of the present invention will preferably have a shelf-stable water activity of less than about 0.7, preferably less than about 0.6. The shelf-stable compositions of the present invention may be packaged as shelf stable products in moisture and oxygen impermeable packaging materials for subsequent leavening and browning in a post extrusion oven such as a conventional home microwave or convection oven.

The dough-like mixture may exit the extruder or the post extrusion mixer through a die having various shapes, such as animal shapes, circles, squares, triangles, star-shapes, and the like, for cutting at the die by a wire cutting device. The extrudate may be cut at the die by a rotating knife for example, for subsequent transfer to a wire cutting device.

The dough-like mixture may be formed into a continuous rope by the use of a round shaped die orifice. It may also be formed into a ribbon or sheet by the use of a horizontally oriented slit or elongated sheet shaped die orifice. The continuous ropes, ribbons, or sheets may be transferred to a wire cutting device or cut into pieces using known reciprocating cutters for subsequent transfer to a wire cutting device.

The dough-like mixtures of the present invention may be extruded without the use of a die plate. The thus obtained extrudate, or even die-extruded extrudates, may be transferred to and formed into pieces using conventional wire cutting machines.

In the case of the dough-like extrudate being cut into individual dough pieces as the dough-like mixture is being extruded in a substantially horizontal direction from the end of the cooker extruder or continuous mixer configured in a horizontal arrangement, a wire cutter can be fitted at the downstream end of the cooker extruder having a substantially vertically reciprocating cutting arrangement. As the dough-like extrudate is extruded, the wire cutter severs or cuts off individual dough pieces, which fall, for example, a small distance onto a conveyor. The shape of the individual dough pieces may somewhat deform due to the falling impact with the conveyor. In the case of the extruder die orifice being circular and thus the individual dough pieces formed having round circular edges, the round edges may undesirably be deformed when impacting with the conveyor, particularly for thinly sliced pieces, resulting in a cookie product having an unsatisfactory appearance. Also, the pieces may not fall onto the conveyor in a substantially uniform pattern. In the mass production of cookies, it is particularly important for the pieces to be arranged substantially uniformly or substantially equally spaced apart to facilitate transferring of the pieces, uniform leavening of the pieces, and packaging of the pieces. Thus, to circumvent this situation, the extruder die can be shaped or oriented so as to provide a rope that when wire cut into individual pieces, will not incur substantial edge damage and will fall onto the moving conveyer in a substantially uniform pattern. Cookie dough pieces less subject to flipping and to edge deformation generally have a low center of gravity, such as ones having a triangular, or semi-circular cross section with the base or widest dimension facing down as shown in FIGS. 23 and 24.

Downward orientation of the extrudate rope so that its longitudinal axis is substantially vertical when wire cut transverse to said axis by a horizontally reciprocating wire may also be used to reduce edge damage and to provide a substantially uniform piece distribution on the conveyor. Downward orientation of the extrudate may be achieved by the use of external flow diverters, internal flow diverters, and manifolds attached to the cooker extruder or post extrusion mixer in accordance with the present invention.

For example, the dough-like extrudate may be cut into individual dough pieces as the dough-like mixture is being extruded in a substantially vertically downward direction from an internal or external flow diverter by a wire cutter fitted at the downstream end of the flow diverter in a substantially horizontal cutting arrangement. As the dough-like extrudate is extruded, the wire cutter severs or cuts off individual dough pieces, which can fall a small distance onto a conveyor. The shape of the individual dough pieces may somewhat deform due to the falling impact with the conveyor. However, in the horizontal cutting arrangement described above, the individual cookie dough pieces will most likely fall with a flat end, formed during cutting the previous piece, landing without substantial deformation or substantial lateral displacement onto the conveyor.

In another embodiment of the process according to the present invention, the cookie dough-like mixture can be diverted and separated into a plurality of dough ropes such as by providing the downstream end of the cooker extruder or continuous mixer with a manifold. The dough ropes exiting the manifold can be immediately cut into individual dough pieces so that they fall without substantial edge damage by wire cutting.

The wire cutter is designed to cut the rope into individual pieces at a rate consistent with the formation of the extrudate. Preferably, the downstream end of the cooker extruder is provided with a manifold for separating the dough-like mixture into eight or more die orifices, to reduce the exit speed of the extrudate out of the plural orifices versus out of a single orifice extruder die. Each orifice can cooperate with an independent wire cutter or, for example, a single wire cutter can operate on all of the orifices.

Unlike conventional cookie production, the extruded dough-like mixtures of the present invention are generally formed into pieces when hot. Excessive cooling of the extrudate may result in crumbling of the pieces upon wire cutting or other cutting or shaping operations. Preferably, the extrudates are formed into pieces at temperatures of from about 100° F. to about 150° F.

Consistency, viscosity and plasticity of the extrudates for proper machining may be adjusted, for example, by: a) water or oil addition or reduction in the extruder, b) water addition or reduction in the post extrusion mixer, or c) heating prior to the die, at the die, or after exiting from the die.

The characteristics of the wire cutting operation and the conditions of the formation of the cookie mixture in the cooker extruder and second stage mixer, such as temperature, pressure, moisture content, and oil content are controlled or adjusted to accomplish successful wire cutting of the cookie mixture. For example, if the cookie mixture is cooled too much prior to wire cutting, the cookie mixture may harden and become too viscous or crumbly for satisfactory wire cutting. Such a cooled mixture will impair operation of wire cutting due to the high loads necessary to cut through the cookie mixture. Further, the speed of the wire cutter will be slowed by the greater resistance of cutting through the cooled mixture.

Also, if the surface of the dough-like extrudate contacting the counter-rotating feed rollers of a conventional wire cut apparatus contains too much free oil due to high water addition or too high a temperature in the extruder, it may tend to slip due to oil separation and accumulation on the surface of the rollers. This may prevent effective feeding of the dough-like extrudate through the wire cutter die to form a dough rope for wire cutting.

Controlling or adjusting the pressure exerted on the cookie mixture may be important with respect to wire cutting the mixture. If too much pressure is exerted, especially at the downstream end of the extruder, oil separation will occur. The substantial loss of oil from the mixture can render the mixture too viscous and cause hardening of the cookie mixture which may hinder wire cutting. Also, the presence of surface oil on the extrudate may cause slippage of the extrudate at the feed rollers of a conventional wire cutter.

Controlling or adjusting the rate of extrusion of the cookie mixture through the cooker extruder and second stage mixer is important to facilitate successful wire cutting. There are practical limits as to the operation of the wire cutter such as the maximum number of cuts per unit time. The mixture cannot be produced at a rate that would require a wire cutter to be operated above its maximum cutting rate. Further, increasing the number of cuts per unit time increases the stress on the wire of the wire cutter by increasing the speed of the wire cutting through the dough. The pieces cut per stroke of a wire cutting device may be increased, for example, by the use of a manifold which divides the flow for cutting by a single wire or a plurality of wires. Also, the hopper wire of a wire cut apparatus or an environment controlled enclosure may serve as an accumulator to accommodate the flow of the dough-like mixture.

POST EXTRUSION HEAT TREATMENT

The extrudate pieces are leavened and further browned using: a) electromagnetic radiation or electronic heating, such as dielectric radio frequency heating, microwave heating, or infrared heating, b) heated air, such as from a convection oven or fluidized bed heater, c) frying, or d) combinations thereof. For example, a combination may comprise microwave heating or dielectric radio frequency heating for internal heating and infrared heating for more intense surface heating. The microwave, infrared, and radio frequency energy may be applied at pressures of from about 0.2 bars to about 6 bars.

When applying dielectric heating, the low conductive food product to be heated is placed between electrodes, which act as capacitor plates, and forms the dielectric of one or more capacitors. A high frequency voltage is applied across the electrodes. Alternating of the electrostatic field or of the polarity of the voltage results in heating of the product.

The frequencies generally used for dielectric heating are about 2 to 90 MHz, e.g. about 13–14 MHz, about 27 MHz, or about 40–41 MHz. The frequencies generally used for microwave heating are, for example, about 2,450 MHz for domestic ovens and about 896 to 915 MHz for industrial ovens.

The heating of the pieces in the dielectric or radio frequency oven, microwave oven, or combinations thereof, or in a fryer is generally performed so that proper leavening and browning is achieved, for example, within about 90 seconds, preferably within about 60 seconds, depending upon the thickness and diameter of the pieces. Infrared heating, conductive heating, and hot air heating are generally conducted within about two to three minutes. Infrared heating should generally be performed subsequent to another form of post extrusion heating. It tends to heat the surface and form a skin which prevents leavening gases from escaping. Generally, the heating of the pieces or cookie preforms in the post extrusion oven should be sufficient to result in an internal temperature of at least about 160° F., preferably at least about 190° F. in the cookie.

Dielectric radio frequency ovens, microwave ovens, infrared ovens, hot air ovens, and the like which may be used are conventional, industrial scale continuous throughput ovens. Continuous, conventional fryers may also be used in embodiments of the present invention. Conductive heating devices which may be used include waffle-type conductive heaters.

The post extrusion heated leavened products of the present invention have a water activity of less than about 0.7, preferably less than about 0.6. The water content of the products is generally less than about 6% by weight, suitably from about 2% by weight to about 4% by weight, based upon the weight of the post extrusion baked product, exclusive of inclusions. The products exhibit a cookie crumb-like structure appearance, and texture and structural integrity. Starch gelatinization (measured by differential scanning calorimetry) for the cookie products of the present invention is generally less than about 5%.

The present invention is further illustrated in the following examples where all parts, ratios, and percentages are by weight and all temperatures are in °F, unless otherwise stated:

EXAMPLE 1

The ingredients, their feed placement, and their relative amounts used to prepare a cookie having a crumb-like structure and texture using extrusion heating, post extrusion mixing and microwave baking in accordance with the present invention were:

| INGREDIENT AND PLACEMENT | WEIGHT % |
| --- | --- |
| Component 1: first dry feed port | |
| Wheat flour, bleached (about 12% by weight water) | 50.19 |
| Non-fat dry milk (about 52% by weight lactose) | 1.51 |
| Salt | 0.75 |
| Component 2: second dry feed port | |
| White sugar (sucrose), granulated | 15.82 |
| Brown sugar (about 89% sucrose, 3% invert, 4% non-sugar solids, 3% water) | 7.38 |
| Component 3: first liquid feed port | |
| Soybean spray oil | 22.53 |
| Component 4: second liquid feed port | |
| Tap water | 0.81 |
| Component 5: second dry feed port | |
| Sodium bicarbonate | 1.01 |
| Total | 100.00 |

The co-rotating twin screw cooker extruder used to prepare the cookie products of the present invention was a Werner and Pfleiderer ZSK-57 equipped with an extruder screw configuration as shown in FIG. 6 of copending U.S. patent application Ser. No. 07/362,579 entitled "Extruder And Continuous Mixer Arrangement For Producing An At Least Partially Baked Product Having A Cookie-Like Crumb Structure", filed in the name of Bernhard Van Lengerich on June 7, 1989. The extruder had twelve barrels, each provided with external, jacketed heating and cooling means. The first dry feed port was set up at barrel 1 and was open to the atmosphere. The first liquid feed port was set up between barrels 1 and 2.

The first barrel, which contained the first dry feed port, was set on constant cool. The remaining eleven barrels were divided into 7 separately measured barrel temperature zones. Barrels 2 and 3 corresponded to temperature zone 1, barrel 4 corresponded to zone 2, barrels 5 and 6 corresponded to zone 3, barrels 7 and 8 corresponded to zones 4, and 5, respectively, barrels 9 and 10 corresponded to temperature zone 6, and barrels 11 and 12 corresponded to temperature zone 7. The thermocouples for measuring actual barrel temperatures were located in barrels 2, 4, 5, 7, 8, 10, and 12. Barrels 2 through 12 were set to heat to 300° F.

Paddles and screw elements were arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to transport the heat treated mass out of the open end of the extruder. An extruder die was not utilized. Gradually increasing the degree of fill tends to reduce points of high pressure which may cause oil separation. The fast conveyance initiated in barrel 8 may be used for the optional addition of crystalline sugar into the heat treatment zone via an optionally opened feed port in barrel 8. The optional addition of the crystalline sugar in barrel 8 may be used to reduce the exposure of the sugar to full heat treatment as a further control over the crunchiness of the cookie.

The twin screw continuous mixer used to prepare the cookie products of the present invention was a Werner and Pfleiderer ZPM-120 equipped with a screw configuration as shown in FIG. 7 of copending U.S. patent application Ser. No. 07/362,579 entitled "Extruder And Continuous Mixer Arrangement For Producing An At Least Partially Baked Product Having A Cookie-Like Crumb Structure", filed in the name of Bernhard Van Lengerich on June 7, 1989. The continuous mixer had three barrel sections fastened end-to-end, each provided with cooling jackets for water flow. A cooling water flow is pumped through the jackets in the barrel sections to reduce and adjust the temperature of the composition during the gentle mixing and conveying in the continuous mixer. The second dry feed port was set up at barrel 1 of the continuous mixer and was open to the atmosphere. The second liquid feed port was the same as the second dry feed port at barrel 1. The second liquid feed inlet pipe was inserted into the open port at barrel 1 so that the second dry feed ingredients and the second liquid feed ingredients were separately fed into the same open port. The vertical output opening of the continuous mixer was located at the bottom end portion of the third barrel.

The single lobe screw element of barrel 1 rapidly conveys the heat treated ingredients comprising flour and oil from the extruder together with the dry ingredients input through the second dry feed port and the added water fed via the second liquid feed port into the screw channel of the continuous mixer.

Kneading discs with intermediate double lobe conveying elements gently mix and convey the dough-like mass including added water toward the vertical output opening. The left hand staggering of some of the kneading discs reduces the rate of conveying within the kneading discs to increase the amount of mixing. Kneading discs with pitch are located downstream of the left hand staggered kneading disks to both mix and convey the ingredients.

The third barrel was equipped with a third feed port, which was open to the atmosphere, for input of shear sensitive and/or heat sensitive ingredients such as particulate ingredients, e.g., nuts, chocolate chips, raisins, etc. This downstream inlet port is arranged above double lobe screw elements which provide a conveyance zone within the continuous mixer for rapid intake of particulate materials, for example, which may be input through the port.

A double lobe conveying element is arranged partially above the vertical output opening to convey the dough-like mass toward and out of the continuous mixer. Kneading discs with pitch located downstream of the latter double lobe conveying element tend to dump the ingredients fed by the double lobe screw element out the opening.

The cooker extruder screws were rotated at about 130 rpm at about 1% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 297 lbs/hrs.

Component 1 was prepared by mixing the ingredients to obtain a substantially homogeneous dry blend. The component 1 dry blend was continuously fed to the first dry feed port. Component 2 was prepared by mixing the ingredients to obtain a second substantially homogeneous dry blend which was continuously fed downstream to the second dry feed port. Component 3 was prepared by melting the semi-solid soybean spray oil to obtain a liquid oil which was continuously fed to the first liquid feed port. Component 4 was continuously fed to the second liquid feed port. Component 5 was continuously fed to the second dry feed port, separate from component 2.

On a calculated basis, the water content of the dough-like mixture formed in the continuous mixer was about 7.1% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 300 | 271 |
| 3 | 300 | — |
| 4 | 300 | 268 |
| 5 | 300 | 300 |
| 6 | 300 | — |
| 7 | 300 | 299 |
| 8 | 300 | 269 |
| 9 | 300 | — |
| 10 | 300 | 265 |
| 11 | 300 | — |
| 12 | 300 | 300 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 217° F. at heating are about 2 to 90 MHz, e.g. about 13-14 MHz, barrel 3, about 222° F. at barrel 5, and about 281° F. at barrel 11. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 201° F. The substantially homogeneous dough-like mixture formed in the continuous mixer was extruded from the mixer without a die and resulted in a substantially unleavened extrudate. The dough-like mixture upon exiting the continuous mixer had a temperature of about 130° F. The dough-like mixture was immediately transferred to an auger fed wire-cutting machine and was cut into pieces while hot. The diameter of the pieces was about 1 inch. The consistency of the dough-like mixture was measured at about 72° F. using an Instron Texture Analyzer Model 4202 equipped with a cylindrical shaped probe having a diameter of 4 mm. The dimensions of the sample were about 1 inch square by about ¼ inch high. The probe was set to penetrate the sample at a constant speed of 0.2 inches/min. With strain measured in inches and stress measured in lbs force, the modulus of the dough-like mixture sample was about 232 psi.

Eight pieces were subjected to microwaving in a microwave oven for about 70 seconds to produce distinctly leavened cookies. The cookies were surface browned and had a crumb-like structure and crumb-like texture.

EXAMPLE 2

Cookies having a crumb-like structure and texture may be produced as in Example 1 except: after wire cutting, the pieces may be subjected to heating in a continuous 12 kw dielectric radio frequency (27 MHz) oven for about 60 seconds to produce distinctly leavened, surface browned cookies.

EXAMPLE 3

The procedure of Example 1 was followed using a composition without added water. The equipment of Example 1 was used in this Example. The ingredients, their feed placement, and their relative amounts were:

| INGREDIENT AND PLACEMENT | WEIGHT % |
|---|---|
| Component 1: first dry feed port | |
| Wheat flour, bleached (about 12% by weight water) | 50.60 |
| Non-fat dry milk (about 52% by weight lactose) | 1.52 |
| Salt | 0.76 |
| Component 2: second dry feed port | |
| White sugar (sucrose), granulated | 15.95 |
| Brown sugar (about 89% sucrose, 3% invert, 4% non-sugar solids, 3% water) | 7.44 |
| Component 3: first liquid feed port | |
| Soybean spray oil | 22.71 |
| Component 4: second liquid feed port | |
| Tap water | none |
| Component 5: second dry feed port | |
| Sodium bicarbonate | 1.02 |
| Total | 100.00 |

The cooker extruder screws were rotated at about 120 rpm at about 1% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 295 lbs/hrs. The components were prepared and fed as in Example 1 except component 4, the tap water, was not used.

On a calculated basis, the water content of the dough-like mixture formed in the continuous mixer was about 6.3% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 300 | 253 |
| 3 | 300 | — |
| 4 | 300 | 253 |
| 5 | 300 | 277 |
| 6 | 300 | — |
| 7 | 300 | 288 |
| 8 | 300 | 268 |
| 9 | 300 | — |
| 10 | 300 | 253 |
| 11 | 300 | — |
| 12 | 300 | 286 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 217° F. at barrel 3, about 222° F. at barrel 5, and about 281° F. at barrel 11. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 205° F. The substantially homogeneous mixture formed in the continuous mixer was extruded from the mixer without a die and resulted in a substantially unleavened extrudate. The mixture upon exiting the continuous mixer had a temperature of about 132° F. The mixture had a low viscosity and was immediately transferred to an auger fed wire-cutting machine. However, the mixture was too soft for cutting on the wire cutter. The modulus of the mixture, as measured in Example 1, was about 35 psi. The low moisture mixture may be packaged as a shelf-stable product.

The viscosity of the mixture, either before or after packaging, may be increased by the addition of water, in an amount of about 1% by weight for example, to provide proper consistency for shaping or machining. The dough-like mixture may then be leavened by subjecting it to microwave energy or convection heating to obtain distinctly leavened, surface browned cookies having a crumb-like structure and texture.

EXAMPLE 4

The procedure of Example 1 was followed using a composition with about 2.45% by weight added water, based upon the weight of the composition. The equipment of Example 1 was used in this Example. The ingredients, their feed placement, and their relative amounts were:

| INGREDIENT AND PLACEMENT | WEIGHT % |
|---|---|
| Component 1: first dry feed port | |
| Wheat flour, bleached (about 12% by weight water) | 49.37 |
| Non-fat dry milk (about 52% by weight lactose) | 1.48 |
| Salt | 0.74 |
| Component 2: second dry feed port | |
| White sugar (sucrose), granulated | 15.55 |
| Brown sugar (about 89% sucrose, 3% invert, 4% non-sugar solids, 3% water) | 7.26 |
| Component 3: first liquid feed port | |
| Soybean spray oil | 22.16 |
| Component 4: second liquid feed port | |
| Tap water | 2.45 |
| Component 5: second dry feed port | |
| Sodium bicarbonate | 0.99 |
| Total | 100.00 |

The components were prepared and fed as in Example 1. The cooker extruder screws were rotated at about 120 rpm at about 1% of maximum torque. The continuous mixer screws were rotated at about 60 rpm at about 19% of maximum torque. The ingredients were fed in their relative amounts to provide a throughput or mass flow rate of the extrudate from the continuous mixer of about 302 lbs/hrs.

On a calculated basis, the water content of the mixture formed in the continuous mixer was about 8.6% by weight, based upon the total weight of the mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 300 | 284 |
| 3 | 300 | — |
| 4 | 300 | 288 |
| 5 | 300 | 300 |
| 6 | 300 | — |
| 7 | 300 | 300 |
| 8 | 300 | 271 |
| 9 | 300 | — |
| 10 | 300 | 278 |
| 11 | 300 | — |
| 12 | 300 | 300 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 237° F. at barrel 3, about 230° F. at barrel 5, and about 248° F. at barrel 11. The average or median residence time of the ingredients heated in the cooker extruder was about 60-90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The extrudate temperature upon exiting the extruder was about 201° F. The substantially homogeneous mixture formed in the continuous mixer was extruded from the mixer without a die and resulted in a substantially unleavened extrudate. The mixture upon exiting the continuous mixer had a temperature of about 130° F. The mixture was immediately transferred to an auger fed wire-cutting machine. However, the mixture was too crumbly for cutting on the wire cutter. The modulus of the mixture, as measured in Example 1, was about 1121 psi.

The consistency of the mixture, can be decreased by increasing the amount of oil, by reducing or increasing the amount of water added, by reducing the heat treating temperatures, or by a combination thereof to provide proper consistency for wire cutting. However, the obtained dough-like mixture may be successfully machined in a rotary molder to form individual pieces. The dough-like mixture may then be leavened by subjecting it to microwave energy or dielectric radio frequency heating to obtain distinctly leavened, surface browned cookies having a crumb-like structure and texture.

EXAMPLE 5

The ingredients, their feed placement, and their relative amounts used to prepare a cookie having a crumb-like structure and texture using extrusion heating, post extrusion mixing and microwave baking in accordance with the present invention were:

| INGREDIENT AND PLACEMENT | WEIGHT % |
|---|---|
| Component 1: first dry feed port | |
| Wheat flour, bleached (about 12% by weight water) | 50.50 |
| Non-fat dry milk (about 52% by weight lactose) | 1.51 |
| Salt | 0.76 |
| Component 2: second dry feed port | |
| White sugar (sucrose), granulated | 15.06 |
| Brown sugar (about 89% sucrose, 3% invert, 4% non-sugar solids, 3% water) | 7.03 |
| Component 3: first liquid feed port | |
| Soybean spray oil | 22.67 |
| Component 4: second liquid feed port | |
| Tap water | 1.22 |
| Component 5: second dry feed port | |
| Sodium bicarbonate | 1.25 |
| Total | 100.00 |

The procedure of Example 1 was followed and the equipment of Example 1 was used in this Example. The cooker extruder screws were rotated at about 125 rpm at about 3% of maximum torque. The continuous mixer screws were rotated at about 60 rpm at about 19% of maximum torque. The ingredients were fed in their relative amounts to provide a throughput or mass flow rate of the dough-like mixture extrudate from the continuous mixer of about 295 lbs/hr.

On a calculated basis, the water content of the dough-like mixture formed in the continuous mixer was about 7.5% by weight, based upon the total weight of the dough-like mixture.

The barrel set temperatures in the cooker extruder were constant cool in barrel 1 and 350° F. in barrels 2 through 12. Actual barrel temperatures for the cooker extruder were not measured.

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The dough-like mixture temperature within the exit of the extruder was about 255°F. The substantially homogeneous mixture formed in the continuous mixer was extruded from the mixer without a die and resulted a substantially unleavened extrudate. The mixture upon exiting the continuous mixer had a temperature of about 126° F. The dough-like mixture was immediately transferred to an auger fed wire-cutting machine and was cut into pieces while about 106° F. The diameter of the pieces was about 1 inch.

Eight pieces were subjected to microwaving in a microwave oven for about 70 seconds to produce distinctly leavened cookies. The cookies were surface browned and had a crumb-like structure and crumb-like texture.

EXAMPLE 6

Cookies having a crumb-like structure and texture using extrusion heating, post extrusion mixing and dielectric radio frequency baking in accordance with the present invention may be produced as in Example 5 except: after wire cutting the pieces may be subjected to heating in a continuous 12 kw dielectric radio frequency (27 MHz) oven set at about 81% power for about 60 seconds to produce distinctly leavened, surface browned cookies.

EXAMPLES 7–8

Cookies having a crumb-like structure and texture may be produced as in Examples 1 and 2 except the downstream end of the extruder may be fitted with a microwave applicator as shown and disclosed in copending U.S. patent application Ser. No. 441,230 entitled "Extruder And Continuous Mixer Arrangement For Producing An At Least Partially Baked Product Having A Cookie-Like Crumb Structure The Extruder Including A Microwave Applicator", filed in the name of Bernhard Van Lengerich on Nov. 22, 1989, which is a continuation of U.S. application Ser. No. 07/362,374 filed June 7, 1989 and now abandoned. The residence of the ingredients within the microwave applicator may be approximately 5–20 seconds to raise the temperature of the ingredients by approximately up to 200° F.

EXAMPLE 9

A cookie having a crumb-like structure and texture using extrusion heating, post extrusion mixing and microwave baking may be produced in accordance with the present invention as in Example 1 except: a) the screw configuration for the Werner and Pfleiderer ZSK-57 cooker extruder may be replaced with the screw configuration shown in FIG. 4 of copending U.S. patent application Ser. No. 07/362,579 entitled "Extruder And Continuous Mixer Arrangement For Producing An At Least Partially Baked Product Having A Cookie-Like Crumb Structure", filed in the name of Bernhard Van Lengerich on June 7, 1989, and b) the Werner and Pfleiderer ZPM-120 continuous mixer may be replaced with a four barrel extruder and screw configuration as shown in FIG. 5 of said latter application.

For the Werner and Pfleiderer ZSK-57 extrusion cooker, paddles and screw elements are arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) further conveying and vigorous mixing in barrels 8, 9, 10 and 11, and h) increased speed of conveyance to transport the heat treated mass out of the open end of the extruder. Gradually increasing the degree of fill tends to reduce points of high pressure which may cause oil separation.

For the second stage twin screw extruder (12 l/d) described in copending U.S. patent application Ser. No. 07/362,579, four barrel sections are fastened end-to-end, each provided with external jacketed heating and cooling means. The second dry feed port is set up at barrel 1 of the second stage extruder and is open to the atmosphere. The second liquid feed port is the same as the second dry feed port at barrel 1. The second liquid feed inlet pipe is inserted into the open port at barrel 1 so that the second dry feed ingredients and the second liquid feed ingredients can be separately fed into the same open port.

For the screw configuration of the second stage twin screw extruder shown in FIG. 5 of copending U.S. patent application Ser. No. 07/362,579, relatively high pitch screw elements are arranged directly below the second dry ingredient feed port and second liquid inlet to convey the added ingredients downstream and away from the feed port. These elements rapidly convey the heat treated mass from the extruder and the liquid and dry ingredients added to the second stage extruder via the second dry ingredient feed port in barrel 1 of the second stage extruder.

The rapid conveying screw elements of barrel 1 are followed by alternating kneading blocks with interposed screw elements in barrel 2 of the second stage extruder. The screw elements in barrel 2 are shorter and of lower pitch than the screw elements of barrel 1 so that, together with the kneading blocks, they act to lower the speed of conveyance and increase the degree of fill to permit thorough mixing by the kneading blocks in barrel 2. However, the number of alternating kneading blocks is fewer than in the first stage cooker extruder to provide a lower pressure and gentle mixing to protect the crystalline structure of the sugar grains.

The alternating kneading blocks are followed by three screw elements in barrel 3 of gradually decreasing pitch and length to feed the ingredients into final kneading blocks for final mixing in barrel 4. In barrel 4 a screw element is interposed between the kneading blocks, and a final screw element is arranged downstream from the kneading blocks to output the at least substantially homogeneous cookie dough from the second stage extruder. The exit portion of the second stage extruder is located at the bottom end portion of barrel 4.

A third dry feed port, open to the atmosphere, can be formed in barrel 3 for input of shear sensitive and/or heat sensitive ingredients such as particulate ingredients, e.g., nuts, chocolate chips etc. The screw elements below the third dry feed port increase the speed of conveyance of the ingredients which decreases the degree of fill and facilitates the intake and mixing of particulate materials by the kneading blocks in barrel 4.

EXAMPLE 10

The ingredients, their feed placement, and their relative amounts used to prepare a cookie having a crumb-like structure and texture using extrusion heating, post extrusion mixing, wire cutting and microwave baking in accordance with the present invention were:

| INGREDIENT AND PLACEMENT | WEIGHT % |
|---|---|
| Component 1: first dry feed port | |
| Wheat flour, bleached (about 12% by weight water) | 46.07 |
| Non-fat dry milk (about 52% by weight lactose) | 1.38 |
| Salt | 0.69 |
| Component 2: second dry feed port | |
| White sugar (sucrose), granulated | 14.52 |
| Brown sugar (about 89% sucrose, 3% invert, 4% non-sugar solids, 3% water) | 6.78 |
| Component 3: first liquid feed port | |
| Soybean spray oil | 16.67 |
| Component 4: second liquid feed port | |
| Tap water | 12.96 |
| Component 5: second dry feed port | |
| Sodium bicarbonate | 0.93 |
| Total | 100.00 |

The procedure of Example 1 was followed and the equipment of Example 1 was used in this Example. The cooker extruder screws were rotated at about 130 rpm at about 2% of maximum torque. The continuous mixer screws were rotated at about 60 rpm at about 21% of maximum torque. The ingredients were fed in their relative amounts to provide a throughput or mass flow rate of the dough-like mixture extrudate from the continuous mixer of about 324 lbs/hr.

On a calculated basis, the water content of the dough-like mixture formed in the continuous mixer was about 18.7% by weight, based upon the total weight of the dough-like mixture.

At steady state, the barrel set temperatures and the actual barrel temperatures for the cooker extruder were:

| Barrel # | Barrel Set Temperature, °F. | Actual Barrel Temperature, °F. |
|---|---|---|
| 1 | cool | — |
| 2 | 300 | 281 |
| 3 | 300 | — |
| 4 | 300 | 293 |
| 5 | 300 | 299 |
| 6 | 300 | — |
| 7 | 300 | 301 |

| Barrel # | Barrel Set Temperature, °F. | Actual Barrel Temperature, °F. |
|---|---|---|
| 8 | 300 | 300 |
| 9 | 300 | — |
| 10 | 300 | 305 |
| 11 | 300 | — |
| 12 | 300 | 300 |

Tap water was passed through the cooling jackets of the continuous mixer to cool the heat treated mass from the extruder while admixing it with the other ingredients fed to the continuous mixer.

The pressure in the extruder and in the continuous mixer was less than about 10 bars. The material temperatures in the extruder were about 250° F. at barrel 3, about 240° F. at barrel 5, and about 283° F. at barrel 11. The average or median residence time of the ingredients heated in the cooker extruder was about 60–90 seconds. The average or median residence time of the ingredients in the continuous mixer from the second feed ports was about 90 to 150 seconds.

The heat treated mass formed in the cooker extruder was extruded without a die and resulted in a slurry-like substantially homogeneous heat treated mass. The heat treated mass was permitted to fall into the second dry ingredient feed port (the upstream end of the continuous mixer). The substantially homogeneous dough-like mixture formed in the continuous mixer was extruded from the mixer without a die and resulted in a substantially unleavened extrudate. The dough-like mixture was immediately transferred to an auger fed wire-cutting machine and was cut into pieces while hot. The diameter of the pieces was about 1 inch.

Six pieces were subjected to microwaving in a microwave oven for about 50 seconds to produce distinctly leavened cookies. The cookies were surface browned and had a crumb-like structure and crumb-like texture.

EXAMPLE 11

Cookies having a crumb-like structure and texture were produced as in Example 10 except: after wire cutting, the pieces were subjected to heating in a continuous 12 kw dielectric radio frequency (27 MHz) oven for about 66 seconds to produce distinctly leavened, surface browned cookies.

EXAMPLE 12

The ingredients, their feed placement, and their relative amounts which may be used to prepare an extruded, partially baked wire cut cookie preform suitable for leavening into a cookie having a crumb-like structure and texture using dielectric radio frequency heating in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

A co-rotating twin screw cooker extruder which may be used to prepare the cookie products of the present invention is a Werner and Pfleiderer ZSK-57 equipped with a screw configuration as shown and described in copending U.S. patent application Ser. No. 07/362,375 entitled "Extruder Apparatus For Producing An At Least Partially Baked Product Having A Cookie-Like Crumb Structure," filed in the name of Bernhard Van Lengerich on June 7, 1989. The extruder may have twelve barrels, each provided with external, jacketed heating and cooling means. First and second dry feed ports may be set up at barrels 1 and 8, respectively. These two dry feed ports may be open to the atmosphere. The first liquid feed port may be set up between barrels 1 and 2. The second liquid feed port may be the same as the second dry feed port at barrel 8. The second liquid feed inlet pipe may be inserted into the open port at barrel 8 so that optional second dry feed ingredients and the second liquid feed ingredients may be separately fed into the same port. Dry ingredients are not fed to the second dry feed port in this example.

The first barrel, which may contain the first dry feed port, may be set on constant cool. The remaining eleven barrels may be divided into 7 separately measured barrel temperature zones. Barrels 2 and 3 may correspond to temperature zone 1, barrel 4 may correspond to zone 2, barrels 5 and 6 may correspond to zone 3, barrels 7 and 8 may correspond to zones 4 and 5, respectively, barrels 9 and 10 may correspond to temperature zone 6, and barrels 11 and 12 may correspond to temperature zone 7. The thermocouples for measuring actual barrel temperatures may be located in barrels 2, 4, 5, 7, 8, 10, and 12.

Barrels 2 through 6 may be set to heat to 350° F., barrel seven to 200° F., barrel eight may be set on constant cool (less than 100° F.), barrels 9 and 10 may be set at 100° F. and barrels 11 and 12 may be set at 110° F.

Paddles and screw elements may be arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying of the ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed to the first dry feed port, but separate from component 1. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder may be about 10.7% by weight, based upon the total weight of the dough-like mixture.

At steady state, the barrel set temperatures and the actual barrel temperatures may be:

| Barrel # | Barrel Set Temperature, °F. | Actual Barrel Temperature, °F. |
|---|---|---|
| 1 | cool | — |
| 2 | 350 | 247 |
| 3 | 350 | — |
| 4 | 350 | 302 |
| 5 | 350 | 333 |
| 6 | 350 | — |
| 7 | 200 | 198 |
| 8 | <100 | 98 |
| 9 | 100 | — |
| 10 | 100 | 105 |
| 11 | 110 | — |
| 12 | 110 | 113 |

The pressure in the extruder may be less than about 10 bars. The material temperatures in the extruder may be about 231° F. at barrel 7, and about 137° F. at barrel 12. The average or median residence time of the ingredients heated prior to addition of component 4 at the second feed port may be about 40-50 seconds. The average or median residence time of the ingredients in the extruder from the second feed port may be about 10 to 20 seconds.

The substantially homogeneous dough-like mixture formed in the extruder may be extruded without a die to obtain a substantially unleavened extrudate dough having a temperature upon exiting the extruder of less than about 150° F. The extrudate may be transferred or dropped into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. The pieces may be subjected to heating in a continuous 12 kw dielectric radio frequency (27 MHz) oven set at about 81% power for 45 seconds to produce distinctly leavened, surface browned cookies having a crumb-like structure and crumb-like texture.

EXAMPLE 13

The ingredients, their feed placement, and their relative amounts which may be used to prepare a wire cut cookie having a crumb-like structure and texture using extrusion heating and dielectric radio frequency baking in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

A co-rotating twin screw cooker extruder which may be used to prepare the cookie products of the present invention is a Werner and Pfleiderer ZSK-57 equipped with a screw configuration as shown and described in copending U.S. patent application Ser. No. 07/362,375 entitled "Extruder Apparatus For Producing An At Least Partially Baked Product Having A Cookie-Like Crumb Structure," filed in the name of Bernhard Van Lengerich on June 7, 1989. The extruder may have twelve barrels, each provided with external, jacketed heating and cooling means. The first and second dry feed ports may be set up at barrels 1 and 8, respectively. These two dry feed ports may be open to the atmosphere. The first liquid feed port may be set up between barrels 1 and 2. The second liquid feed port may be the same as the second dry feed port at barrel 8. The second liquid feed inlet pipe may be inserted into the open port at barrel 8 so that the second dry feed ingredients and the second liquid feed ingredients may be separately fed into the same port.

The first barrel, which may contain the first dry feed port, may be set on constant cool. The remaining eleven barrels may be divided into 7 separately measured barrel temperature zones. Barrels 2 and 3 may correspond to temperature zone 1, barrel 4 may correspond to zone 2, barrels 5 and 6 may correspond to zone 3, barrels 7 and 8 may correspond to zones 4 and 5, respectively, barrels 9 and 10 may correspond to temperature zone 6, and barrels 11 and 12 may correspond to temperature zone 7. The thermocouples for measuring actual barrel temperatures may be located in barrels 2, 4, 5, 7, 8, 10, and 12.

Barrels 2 through 6 may be set to heat to 350° F., barrel seven to 200° F., barrel eight may be set on constant cool, barrels 9 and 10 may be set at 100° F. and barrels 11 and 12 may be set at 120° F.

Paddles and screw elements may be arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f)

increased mixing, conveying, and increased mixing to provide the highest degree of mixing in barrel 7, g) fast conveying of the dry and liquid ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semisolid soybean spray oil to obtain a liquid oil which may be continuously fed to the first liquid feed port. Component 4 may be continuously fed to the second liquid feed port.

On a calculated basis, the water content of the dough-like mixture formed in the extruder may be about 10.7% by weight, based upon the total weight of the dough-like mixture.

At steady state, the barrel set temperatures and the actual barrel temperature may be:

| Barrel # | Barrel Set Temperature, °F. | Actual Barrel Temperature, °F. |
|---|---|---|
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder may be less than about 10 bars. The average or median residence time of the ingredients heated prior to addition of components 2 and 4 at the second feed ports may be about 40–50 seconds. The average or median residence time of the ingredients in the extruder from the second feed ports may be about 10 to 20 seconds.

The substantially homogeneous dough-like mixture formed in the extruder may be extruded without a die to obtain a substantially unleavened extrudate dough having a temperature upon exiting the extruder of less than about 150° F. The extrudate may be transferred or dropped into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. The pieces may be subjected to heating in a continuous 12 kw dielectric radio frequency (27 MHz) oven set at about 81% power for about 45 seconds to produce distinctly leavened, surface browned cookies having a crumb-like structure and crumb-like texture.

EXAMPLE 14

The ingredients, their feed placement, and their relative amounts which may be used to prepare a wire cut cookie having a crumb-like structure and texture using extrusion heating and microwave baking in accordance with the present invention are:

| INGREDIENT AND PLACEMENT | WEIGHT % |
|---|---|
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

A co-rotating twin screw cooker extruder which may be used to prepare the cookie products of the present invention is a Werner and Pfleiderer ZSK-57 equipped with a screw configuration as shown and described in copending U.S. patent application Ser. No. 07/362,375 entitled "Extruder Apparatus For Producing An At Least Partially Baked Product Having A Cookie-Like Crumb Structure," filed in the name of Bernhard Van Lengerich on June 7, 1989. The extruder may have twelve barrels, each provided with external, jacketed heating and cooling means. First and second dry feed ports may be set up at barrels 1 and 8, respectively. These two dry feed ports may be open to the atmosphere. The first liquid feed port may be set up between barrels 1 and 2. The second liquid feed port may be the same as the second dry feed port at barrel 8. The second liquid feed inlet pipe may be inserted into the open port at barrel 8 so that optional second dry feed ingredients and the second liquid feed ingredients may be separately fed into the same port. Dry ingredients are not fed to the second dry feed port in this example.

The first barrel, which may contain the first dry feed port, may be set on constant cool. The remaining eleven barrels may be divided into 7 separately measured barrel temperature zones. Barrels 2 and 3 may correspond to temperature zone 1, barrel 4 may correspond to zone 2, barrels 5 and 6 may correspond to zone 3, barrels 7 and 8 may correspond to zones 4 and 5, respectively, barrels 9 and 10 may correspond to temperature zone 6, and barrels 11 and 12 may correspond to temperature zone 7. The thermocouples for measuring actual barrel temperatures may be located in barrels 2, 4, 5, 7, 8, 10, and 12.

Barrels 2 through 6 may be set to heat to 350° F., barrel seven to 200° F., barrel eight may be set on constant cool, barrels 9 and 10 may be set at 100° F. and barrels 11 and 12 may be set at 120° F.

Paddles and screw elements may be arranged on the screw shafts from upstream to downstream to provide:

a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying of the ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed to the first dry feed port but separate from component 1. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder may be about 10.7% by weight, based upon the total weight of the dough-like mixture.

At steady state, the barrel set temperatures and the actual barrel temperatures may be:

| Barrel # | Barrel Set Temperature, °F. | Actual Barrel Temperature, °F. |
| --- | --- | --- |
| 1 | cool | — |
| 2 | 350 | 209 |
| 3 | 350 | — |
| 4 | 350 | 265 |
| 5 | 350 | 274 |
| 6 | 350 | — |
| 7 | 200 | 198 |
| 8 | cool | 98 |
| 9 | 100 | — |
| 10 | 100 | 99 |
| 11 | 120 | — |
| 12 | 120 | 124 |

The pressure in the extruder may be less than about 10 bars. The average or median residence time of the ingredients heated prior to addition of component 4 at the second feed port may be about 40–50 seconds. The average or median residence time of the ingredients in the extruder from the second feed port may be about 10 to 20 seconds.

The substantially homogeneous dough-like mixture formed in the extruder may be extruded without a die to obtain a substantially unleavened extrudate dough having a temperature upon exiting the extruder of less than about 150° F. The extrudate may be transferred or dropped into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. Six of the pieces may be subjected to microwaving in a microwave oven for about 60 seconds to produce distinctly leavened, surface browned cookies having a crumb-like structure and crumb-like texture.

EXAMPLE 15

The ingredients, their feed placement, and their relative amounts which may be used to prepare a cookie having a crumb-like structure and texture using extrusion heating and microwave baking in accordance with the present invention are:

| INGREDIENT AND PLACEMENT | WEIGHT % |
| --- | --- |
| Component 1: first dry feed port | |
| Wheat flour, bleached (about 12% by weight water) | 48.43 |
| Non-fat dry milk (about 52% by weight lactose) | 1.45 |
| Salt | 0.73 |
| Component 2: second dry feed port | |
| White sugar (sucrose), granulated | 14.53 |
| Brown sugar (about 89% sucrose, 3% invert, 4% non-sugar solids, 3% water) | 6.78 |
| Component 3: first liquid feed port | |
| Soybean spray oil | 24.21 |
| Component 4: second liquid feed port | |
| Tap water | 3.87 |
| Total | 100.00 |

A co-rotating twin screw cooker extruder which may be used to prepare the cookie products of the present invention is a Werner and Pfleiderer ZSK-57 equipped with a screw configuration as shown and described in copending U.S. patent application Ser. No. 07/362,375 entitled "Extruder Apparatus For Producing An At Least Partially Baked Product Having A Cookie-Like Crumb Structure," filed in the name of Bernhard Van Lengerich on June 7, 1989. The extruder may have twelve barrels, each provided with external, jacketed heating and cooling means. The first and second dry feed ports may be set up at barrels 1 and 8, respectively. These two dry feed ports may be open to the atmosphere. The first liquid feed port may be set up between barrels 1 and 2. The second liquid feed port may be the same as the second dry feed port at barrel 8. The second liquid feed inlet pipe may be inserted into the open port at barrel 8 so that the second dry feed ingredients and the second liquid feed ingredients may be separately fed into the same port.

The first barrel, which may contain the first dry feed port, may be set on constant cool. The remaining eleven barrels may be divided into 7 separately measured barrel temperature zones. Barrels 2 and 3 may correspond to temperature zone 1, barrel 4 may correspond to zone 2, barrels 5 and 6 may correspond to zone 3, barrels 7 and 8 may correspond to zones 4 and 5, respectively, barrels 9 and 10 may correspond to temperature zone 6, and barrels 11 and 12 may correspond to temperature zone 7. The thermocouples for measuring actual barrel temperatures may be located in barrels 2, 4, 5, 7, 8, 10, and 12.

Barrels 2 through 6 may be set to heat to 350° F., barrel seven to 200° F., barrel eight may be set on constant cool, barrels 9 and 10 may be set at 100°F. and barrels 11 and 12 may be set at 120° F.

Paddles and screw elements may be arranged on the screw shafts from upstream to downstream to provide: a) rapid conveying of the added dry ingredients in barrel 1, b) conveying of the dry ingredients and added oil and gradually increasing the degree of fill in barrel 2, c) chopping or mixing action for admixing the oil and dry ingredients, conveying to gradually increase the degree of fill, and mixing in barrel 3, d) repeated conveying and an increased degree of mixing in barrel 4, e) increased mixing, conveying and increased mixing to gradually increase the degree of fill in each of barrels 5 and 6, f) increased mixing, conveying, and increased mixing to provide the highest degree of mixing in barrel 7, g) fast conveying of the dry and liquid ingredients fed to the port in barrel 8, h) conveying with a gradual increase in degree of fill in barrel 9, i) conveying and mixing with a gradual increase in degree of fill in barrel 10, j) conveying and mixing in barrel 11, and k) conveying with a buildup in pressure sufficient to extrude the dough-like mixture through the extruder die. Gradually increasing the degree of fill tends to reduce points of high pressure which may cause oil separation.

The screws may be rotated at about 125 rpm at about 2% of maximum torque. The ingredients may be fed in their relative amounts to provide a throughput or mass flow rate of the dough-like mixture extrudate of about 405 lbs/hr.

Component 1 may be prepared by mixing the ingredients to obtain a substantially homogeneous dry blend. The component 1 dry blend may be continuously fed to the first dry feed port. Component 2 may be prepared by mixing the ingredients to obtain a second substantially homogenous dry blend which may be continuously fed downstream to the second dry feed port. Component 3 may be prepared by melting the semi-solid soybean spray oil to obtain a liquid oil which may be continuously fed to the first liquid feed port. Component 4 may be continuously fed to the second liquid feed port.

On a calculated basis, the water content of the dough-like mixture formed in the extruder may be about 10.7% by weight, based upon the total weight of the dough-like mixture.

At steady state, the barrel set temperatures and the actual barrel temperatures may be:

| Barrel # | Barrel Set Temperature, °F. | Actual Barrel Temperature, °F. |
| --- | --- | --- |
| 1 | cool | — |
| 2 | 350 | 206 |
| 3 | 350 | — |
| 4 | 350 | 245 |
| 5 | 350 | 324 |
| 6 | 350 | — |
| 7 | 200 | 201 |
| 8 | cool | <100 |
| 9 | 100 | — |
| 10 | 100 | <100 |
| 11 | 120 | — |
| 12 | 120 | 115 |

The pressure in the extruder may be less than about 10 bars. The average or median residence time of the ingredients heated prior to addition of components 2 and 4 at the second feed ports may be about 40–50 seconds. The average or median residence time of the ingredients in the extruder from the second feed ports may be about 10 to 20 seconds.

The substantially homogeneous dough-like mixture formed in the extruder may be extruded without a die to obtain a substantially unleavened extrudate dough having a temperature upon exiting the extruder of less than about 150° F. The extrudate may be transferred or dropped into the hopper of a conventional cookie wire-cutting machine. The wire-cutting machine may be equipped with a screw-type or auger feed or counter-rotating grooved rollers for feeding the extrudate through nozzles. Upon emerging through the nozzles, the extrudate is cut into cylindrical pieces by the wire. Six of the pieces may be subjected to heating in a microwave oven for about 60 seconds to produce distinctly leavened, surface browned cookies having a crumb-like structure and crumb-like texture.

EXAMPLES 16–19

Wire cut cookies having a crumb-like structure and texture may be produced as in Examples 12 through 15 except the downstream end of the cooker extruder can be fitted with a 90° elbow flow diverter for diverting the flow of the cookie mixture downwardly. The substantially homogeneous dough-like mixture formed in the extruder may be extruded through the 90° elbow external flow diverter to obtain a substantially unleavened extrudate dough having a temperature upon exiting the extruder of less than about 150° F. The extrudate may be transferred or dropped into the hopper of the conventional cookie wire cut apparatus and cut into pieces, followed by heating of the pieces to produce distinctly leavened, surface browned cookies having a crumb-like structure and crumb-like texture.

EXAMPLES 20–23

Wire cut cookies having a crumb-like structure and texture may be produced as in Examples 12 through 15 except the downstream end of the extruder may be connected into an environmentally controlled enclosure provided above a wire cut apparatus. The substantially homogeneous dough-like mixture formed in the extruder may be extruded to obtain a substantially unleavened extrudate dough having a temperature upon exiting the extruder of less than about 150° F. The extrudate may be dropped into the hopper of the wire cut apparatus provided with an environmentally controlled enclosure. The environment within the enclosure may be set to obtain an extrudate temperature of 150° F., with slightly added moisture and at ambient pressure. The wire cut apparatus may be equipped with counter-rotating feed rollers for feeding the extrudate through a die as in Examples 1 through 4. Upon emerging through the die, the extrudate may be cut into pieces by a wire cutter. The pieces may be subjected to heating as in Examples 1 through 4 to produce distinctly leavened, surface browned cookies having a crumb-like structure and crumb-like texture.

EXAMPLES 24–27

Wire cut cookies having a crumb-like structure and texture may be produced as in Examples 20 through 23 except the environment within the enclosure may be set to obtain an extrudate temperature of 120° F. for wire cutting.

EXAMPLES 28-31

Wire cut cookies having a crumb-like structure and texture may be produced as in Examples 12-15 except: the substantially homogeneous dough-like mixture formed in the extruder may be extruded through an extruder die having a die nozzle fitted to the downstream end of the extruder to obtain a substantially unleavened extrudate dough rope having a temperature upon exiting the extruder of less than about 150° F. A wire cutter may be attached to the downstream end of the extruder at the exit end of the die nozzle of the extruder die. Upon emerging through the nozzle, the extrudate dough rope may be cut into cylindrical pieces by the wire cutter.

EXAMPLES 32-35

Wire cut cookies having a crumb-like structure and texture may be produced as in Examples 12-15 except: the downstream end of the cooker extruder may be provided with a 90° elbow flow diverter to divert the flow of the cookie mixture downwardly from the cooker extruder configured in a horizontal arrangement. The substantially homogeneous dough-like mixture formed in the extruder may be extruded through an extruder die having a die nozzle fitted to the downstream end of the 90° elbow flow diverter to obtain a substantially unleavened extrudate dough rope having a temperature upon exiting the 90° elbow flow diverter of less than about 150° F. A wire cutter may be attached to the downstream end of the 90° elbow flow diverter at the exit end of the die nozzle of the extruder die. Upon emerging through the nozzle, the extrudate dough rope may be cut into cylindrical pieces by the wire cutter.

EXAMPLES 36-39

Wire cut cookies having a crumb-like structure and texture may be produced as in Examples 12-15 except: the downstream end of the cooker extruder may be provided with an internal flow diverter comprising a replacement barrel section having an end plate and downwardly extending exit port to internally divert the flow downwardly. The substantially homogeneous dough-like mixture formed in the extruder may be extruded through an extruder die having a die nozzle fitted to the downstream end of the internal flow diverter to obtain a substantially unleavened extrudate dough rope having a temperature upon exiting the internal flow diverter of less than about 150° F. A wire cutter may be attached to the downstream end of the internal flow diverter at the exit end of the die nozzle of the extruder die. Upon emerging through the nozzle, the extrudate dough rope may be cut into cylindrical pieces by the wire cutter.

EXAMPLES 40-43

Wire cut cookies having a crumb-like structure and texture may be produced as in Examples 12-15 except: The downstream end of the extruder may be provided with a sheet forming die having a plurality of separating wires for cutting the extrudate into a plurality of strips. A wire cutter may be positioned at the end of the sheet forming die for cutting the strips into pieces. The substantially homogeneous dough-like mixture formed in the extruder may be extruded through the sheet forming die having a plurality of separating wires to obtain substantially unleavened extrudate dough strips having a temperature upon exiting the sheet forming die of less than about 150° F. Upon emerging through the nozzle, the extrudate dough strips may be cut into pieces by the wire cutter.

What is claimed is:

1. A process for making cookie products, comprising:
   adding cookie ingredients to a cooker extruder and heating the ingredients to a temperature of at least about 150° F. while avoiding substantial starch gelatinization to form a heat treated mass;
   transferring the heat treated mass to a second stage mixer to form a dough-like cookie mixture;
   extruding the dough like cookie mixture; and
   wire cutting the extruded dough-like cookie mixture into individual leavenable pieces.

2. A process according to claim 1, wherein at least one additional cookie ingredient is added with the heat treated mass to the second stage mixer to form the cookie mixture.

3. A process according to claim 1, wherein the dough-like cookie mixture is wire cut upon exiting the second stage mixer.

4. A process according to claim 1, wherein the dough-like cookie mixture is transferred to a wire cut apparatus comprising a rotating feeding device and a die.

5. A process according to claim 1, wherein the heat treated mass is added to the second stage mixer by gravity feeding.

6. A process according to claim 2, wherein said at least one additional ingredient includes at least one crystalline sugar.

7. A process according to claim 2, wherein said at least one additional ingredient includes water.

8. A process according to claim 3, including adjusting the flow rate of the cookie mixture from the second stage mixer to enable wire cutting into pieces.

9. A process according to claim 1, including adjusting the temperature of the dough-like cookie mixture to enable wire cutting into individual pieces.

10. A process according to claim 1, including adjusting the viscosity of the dough-like cookie mixture to enable wire cutting into individual pieces.

11. A process according to claim 1, including adjusting the composition of the dough-like cookie mixture to enable wire cutting into individual pieces.

12. A process according to claim 1, including diverting the flow of the cookie mixture downstream relative to the second stage mixer for wire cutting of the cookie mixture.

13. A process according to claim 1, including separating a flow path of the cookie mixture from the second stage mixer into a plurality of flow paths for wire cutting of the cookie mixture.

14. A process according to claim 1, including feeding the dough-like cookie mixture to a wire cut apparatus comprising counter-rotating feed rollers, a die and a wire cutter to cut the dough-like cookie mixture into individual pieces.

15. A process according to claim 1, including forming the dough-like cookie mixture into a sheet, and cutting the sheet into individual pieces.

16. A process according to claim 15, wherein the dough-like cookie mixture is formed into a sheet by feeding the cookie mixture through a sheet forming die.

17. A process according to claim 1, wherein the dough-like cookie mixture is wire cut at a temperature of from about 100° F. to about 150° F.

18. A process according to claim 1, including heat treating the heat treated mass with a microwave applicator.

19. A process for making cookie products, comprising:
adding cookie ingredients to a cooker extruder;
heat treating the cookie ingredients within the cooker extruder to form a heat treated dough-like cookie mixture that is capable of being wire cut;
transferring the dough-like cookie mixture from the cooker extruder to a wire cut apparatus having a feeding device and a die;
extruding the dough-like mixture through the die of the wire cut apparatus to form at least one dough-like rope; and
wire cutting the at least one dough rope into individual leavenable pieces.

20. A process according to claim 19, wherein said feeding device includes counter-rotating feed rollers.

21. A process according to claim 19, wherein the individual pieces are transferred to an oven for post extrusion leavening.

22. A process according to claim 19 wherein the dough-like cookie mixture is transferred to the wire cut apparatus by gravity feeding.

23. A process according to claim 19, wherein the dough-like cookie mixture is transferred from the cooker extruder by means of a conveying conduit.

24. A process according to claim 19, wherein the dough-like cookie mixture is transferred from the cooker extruder by means of a conveyor.

25. A process according to claim 24, wherein said conveyor is a belt conveyor.

26. A process according to claim 19, wherein the dough-like mixture is transferred from the cooker extruder through an environmentally controlled atmosphere to the wire cut apparatus.

27. A process according to claim 19, wherein the temperature of the dough-like mixture upon wire cutting is from about 100° F. to about 150° F.

28. A process for making cookie products, comprising:
adding cookie ingredients to a cooker extruder and heating the ingredients to form a heat treated dough-like cookie mixture;
extruding the dough-like cookie mixture from the cooker extruder into a cross-sectional shape which prevents edge damage during transfer of individual pieces from the cooker extruder; and
wire cutting the dough-like cookie mixture into individual leavenable pieces upon exiting the cooker extruder.

29. A process according to claim 28, wherein the temperature of the dough-like cookie mixture upon wire cutting is from about 100° F. to about 150° F.

30. A process according to claim 28, wherein the dough-like cookie mixture is extruded into a rope having a triangular cross section.

31. A process according to claim 28, wherein the dough-like cookie mixture is extruded into a rope having a semi-circular cross section.

32. A process according to claim 28, wherein the individual pieces are transferred to an oven for post extrusion leavening.

33. A process according to claim 28, wherein a flow of the dough-like cookie mixture is diverted externally relative to the cooker extruder to change the cutting orientation of the dough-like cookie mixture being extruded from the cooker extruder.

34. A process according to claim 33, wherein the dough-like cookie mixture is extruded in a substantially horizontal direction within the cooker extruder and diverted downwardly upon exiting the cooker extruder.

35. A process according to claim 28, wherein a flow of the dough-like cookie mixture is diverted internally within the cooker extruder to change the cutting orientation of the dough-like cookie mixture being extruded from the cooker extruder.

36. A process according to claim 35, wherein the dough-like cookie mixture is extruded in a substantially horizontal direction within the cooker extruder and diverted downwardly before exiting the cooker extruder.

37. A process for making cookie products, comprising:
adding cookie ingredients to a cooker extruder and heating the ingredients to form a heat treated dough-like cookie mixture;
diverting the flow of the heat treated dough-like cookie mixture;
extruding the dough-like cookie mixture;
wire cutting the dough-like cookie mixture into individual leavenable pieces; and
transferring the wire cut pieces to a conveyor, wherein said diverting of the flow of the heat treated dough-like cookie mixture is to a direction which enables wire cutting of the dough-like cookie mixture without edge damage to the wire cut pieces during transfer.

38. A process according to claim 37, wherein the temperature of the dough-like cookie mixture upon wire cutting is from about 100° F. to about 150° F.

39. A process according to claim 37, wherein a flow of the dough-like cookie mixture is diverted externally relative to the cooker extruder to change the cutting orientation of the dough-like cookie mixture being extruded from the cooker extruder.

40. A process according to claim 37, wherein a flow of the dough-like cookie mixture is diverted internally within the cooker extruder to change the cutting orientation of the dough-like cookie mixture being extruded from the cooker extruder.

41. A process according to claim 37, wherein a flow of the dough-like cookie mixture is separated into a plurality of flow paths upon exiting the cooker extruder.

42. A process according to claim 39, wherein a flow of the dough-like cookie mixture is separated into a plurality of flow paths upon exiting the cooker extruder.

43. A process according to claim 40, wherein a flow of the dough-like cookie mixture is separated into a plurality of flow paths upon exiting the cooker extruder.

44. A process according to claim 37, wherein the dough-like cookie mixture is cut into cookie pieces having substantially flat bottoms facing downwardly upon wire cutting.

45. A process according to claim 44, wherein the cookie pieces have a substantially round cross section.

46. A process for making cookie products, comprising:
adding cookie ingredients to a cooker extruder and heating the ingredients to form a heat treated dough-like mixture;

separating the flow path of the dough-like cookie mixture through the cooker extruder to form plural dough ropes; and wire cutting the dough ropes into individual leavenable dough pieces.

47. A process according to claim 46, wherein the temperature of the dough-like cookie mixture is from about 100° F. to about 150° F. upon wire cutting.

48. A process according to claim 46, wherein a flow of the dough-like cookie mixture is diverted externally relative to the cooker extruder to change the cutting orientation of the dough-like cookie mixture being extruded from the cooker extruder.

49. A process according to claim 48, wherein the dough-like cookie mixture is extruded in a substantially horizontal direction within the cooker extruder and diverted downwardly before exiting the cooker extruder.

50. A process according to claim 46, wherein a flow of the dough-like cookie mixture is diverted internally within the cooker extruder to change the cutting orientation of the dough-like cookie mixture being extruded from the cooker extruder.

51. A process according to claim 50, wherein the dough-like cookie mixture is extruded in a substantially horizontal direction within the cooker extruder and diverted downwardly before exiting the cooker extruder.

52. A process for making cookie products, comprising:

adding cookie ingredients to a cooker extruder and heating the ingredients to form a heat treated dough-like cookie mixture;

transferring the dough-like cookie mixture to a sheet forming device;

forming the dough-like cookie mixture into a dough sheet; and cutting the dough sheet with at least one wire.

53. A process according to claim 52, wherein the dough sheet is cut into longitudinal strips by a plurality of wires and the strips are cut into pieces by a wire cutter.

54. A process according to claim 52, wherein the temperature of the dough-like cookie mixture upon wire cutting is from about 100° F. to about 150° F.

* * * * *

UNITED STATES PATENT AND TRADEMARK OFFICE
CERTIFICATE OF CORRECTION

PATENT NO. : 5,077,074

DATED : December 31, 1991

INVENTOR(S) : Bernhard van Lengerich

It is certified that error appears in the above—identified patent and that said Letters Patent is hereby corrected as shown below:

Title page, disclaimer should read as follows:

--The portion of the term of this patent subsequent to March 12, 2008 has been disclaimed.--

Signed and Sealed this

Twentieth Day of April, 1993

*Attest:*

MICHAEL K. KIRK

*Attesting Officer*      *Acting Commissioner of Patents and Trademarks*